US012749886B2

(12) United States Patent
Oner et al.

(10) Patent No.: US 12,749,886 B2
(45) Date of Patent: Sep. 29, 2026

(54) METHODS AND APPARATUS TO DISCONNECT CIRCUITRY RESPONSIVE TO A FAULT CONDITION

(71) Applicant: Texas Instruments Incorporated, Dallas, TX (US)

(72) Inventors: Hakan Oner, San Jose, CA (US); Marc Davis-Marsh, San Jose, CA (US); Ankit Gupta, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 102 days.

(21) Appl. No.: 18/590,123

(22) Filed: Feb. 28, 2024

(65) Prior Publication Data

US 2025/0273948 A1 Aug. 28, 2025

(51) Int. Cl.
*H02H 3/08* (2006.01)

(52) U.S. Cl.
CPC .................................... *H02H 3/08* (2013.01)

(58) Field of Classification Search
CPC ........................................................ H02H 3/08
USPC ........................................................ 361/93.1
See application file for complete search history.

(56) References Cited

U.S. PATENT DOCUMENTS 6,275,958 B1 8/2001 Carpenter
8,106,640 B2 1/2012 Itakura
9,257,897 B2 2/2016 Saeck
10,277,111 B2 4/2019 Chiereghin
2008/0012542 A1* 1/2008 Liu ........................ H02M 1/32 323/271
2020/0366183 A1* 11/2020 Lam ........................ G06F 1/263
2023/0076383 A1* 3/2023 Jenkins ..................... G05F 1/56

FOREIGN PATENT DOCUMENTS

CN 101447666 B 10/2013
EP 2876809 B1 9/2021

OTHER PUBLICATIONS

Harris Sarah L. et al: "Digital Design and Computer Architecture: ARM Edition" In: "Digital Design and Computer Architecture: ARM Edition", May 6, 2015 (May 6, 2015), Morgan Kaufmann Publishers Inc., San Francisco, CA, United States, XP093273646, ISBN: 978-0-12-800056-4 pp. 1-732, section 1.7.5; pp. 31-51.

* cited by examiner

*Primary Examiner* — Michael R. Fin
(74) *Attorney, Agent, or Firm* — Charles F. Koch

(57) ABSTRACT

An example apparatus includes: a supply terminal; fuse circuitry having a first terminal, a second terminal, and an enable terminal, the first terminal of the fuse circuitry coupled to the supply terminal; fault circuitry having an enable terminal and a fault terminal, the enable terminal coupled to the supply terminal, the fault terminal coupled to the enable terminal of the fuse circuitry; and converter circuitry having a terminal coupled to the second terminal of the fuse circuitry.

20 Claims, 6 Drawing Sheets

METHODS AND APPARATUS TO DISCONNECT CIRCUITRY RESPONSIVE TO A FAULT CONDITION

TECHNICAL FIELD

This description relates generally to fault circuitry and, more particularly, to methods and apparatus to disconnect circuitry responsive to a fault condition.

BACKGROUND

Continuing advancements in electronics allow circuitry to perform increasingly complex operations across a wide range of operating conditions. As electronics continue to advance, designers are incentivized to develop additional safety features to increase reliably and protect circuitry from harmful operating conditions. For example, voltage converter circuitry may receive, from a power source, a wide range of supply voltages that, if supplied to some converter components, may damage the converter circuitry, as well as downstream circuitry. Designers have begun to include fuse circuitry as a way of electrically disconnecting circuitry from a power source. Fault circuitry controls the fuse circuitry responsive to checking for fault conditions. When the fault circuitry detects a fault condition is met, the fault circuitry disconnects the power source using the fuse circuitry. Fuse circuitry and fault circuitry prevent dangerous operating conditions from damaging circuitry.

SUMMARY

For methods and apparatus to disconnect circuitry responsive to a fault condition, an example apparatus includes a supply terminal; fuse circuitry having a first terminal, a second terminal, and an enable terminal, the first terminal of the fuse circuitry coupled to the supply terminal; fault circuitry having an enable terminal and a fault terminal, the enable terminal coupled to the supply terminal, the fault terminal coupled to the enable terminal of the fuse circuitry; and converter circuitry having a terminal coupled to the second terminal of the fuse circuitry. Other examples are described.

For methods and apparatus to disconnect circuitry responsive to a fault condition, an example apparatus includes a supply terminal; fault detection circuitry having a terminal; fault latch circuitry having a first terminal, a second terminal, and a third terminal, the first terminal of the fault latch circuitry coupled to the supply terminal, the second terminal of the fault latch circuitry coupled to the terminal of the fault detection circuitry; and a transistor having a first terminal and a control terminal, the first terminal coupled to the supply terminal, the control terminal of the transistor coupled to the third terminal of the fault latch circuitry. Other examples are described.

For methods and apparatus to disconnect circuitry responsive to a fault condition an example apparatus includes fuse circuitry configured to control a supply of power; and fault circuitry coupled to the fuse circuitry, the fault circuitry configured to: generate an assert fault indication responsive to a fault condition being met; set a fault gate indication responsive to latching the assert fault indication; disable the supply of power by the fuse circuitry responsive to latching the assert fault indication; and reset the fault gate indication responsive to a reset condition being met. Other examples are described.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
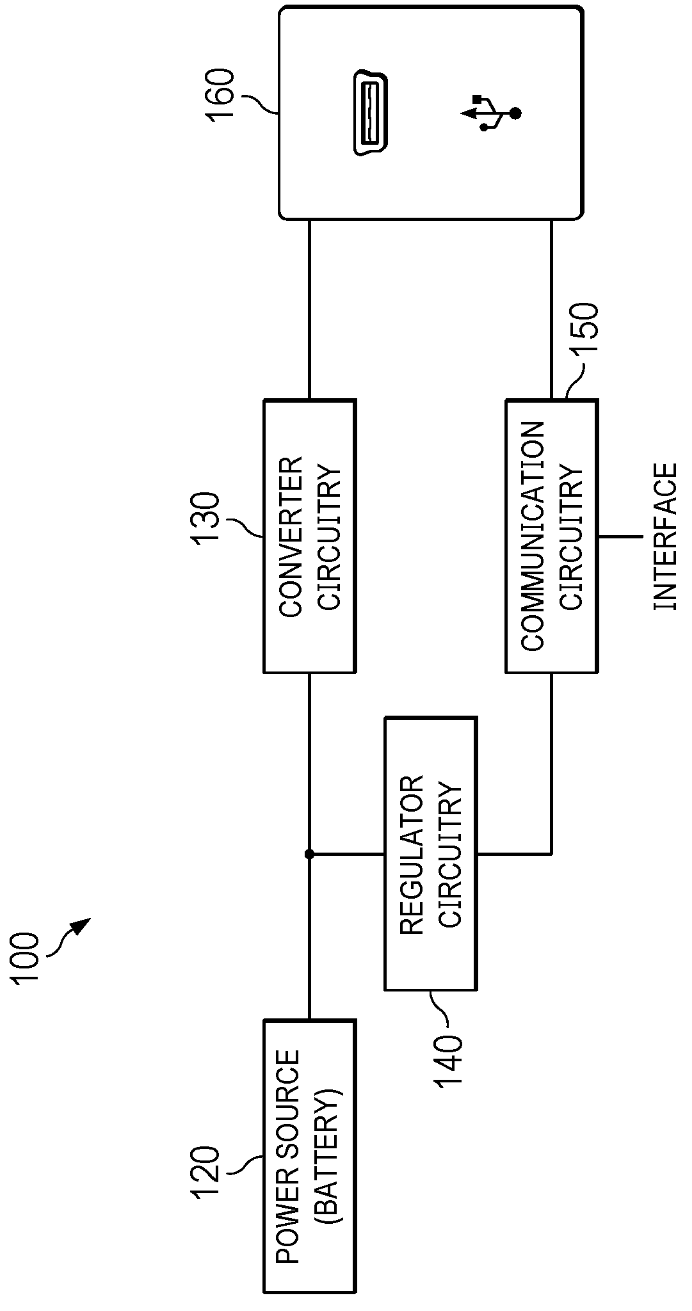
FIG. 1 is a block diagram of an example system in which converter circuitry regulates a supply of power from a power source to supply power to a universal serial bus (USB) port.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Continuing advancements in electronics allow circuitry to perform increasingly complex operations across a wide range of operating conditions. As electronics continue to advance, designers develop additional safety features to increase reliably and protect circuitry from harmful operating conditions. For example, voltage converter circuitry may receive, from a power source, a wide range of supply voltages that, if supplied to some converter components, may damage the converter circuitry, as well as downstream circuitry. Designers have begun to include fuse circuitry as a way of electrically disconnecting circuitry from a power source. Fault circuitry controls the fuse circuitry responsive to checking for fault conditions. When the fault circuitry detects that a fault condition is met, the fault circuitry disconnects the power source using the fuse circuitry. Fuse circuitry and fault circuitry prevent dangerous operating conditions from damaging circuitry.

In some applications, converter circuitry is coupled to a power source by fuse circuitry. In such applications, additional circuitry controls the fuse circuitry to properly disconnect a supply of power to prevent converter components, as well as downstream circuitry, from being exposed to harmful operating conditions. Fault circuitry has become an increasingly common way of implementing operations to control fuse circuitry. The fault circuitry is coupled to one or more terminals of the circuitry, which are to be monitored for fault conditions. The fault circuitry compares voltages and states of the one or more terminals to voltages and states that represent fault conditions. If the fault circuitry determines a condition (e.g., a state, voltage, etc.) of the one or more terminals represents a fault condition, the fault circuitry generates an assert fault indication. For example, the fault circuitry determines a fault condition is met responsive to a determination that a terminal is supposed to be equal to a common potential (e.g., ground) but is determined to have a voltage equal to a supply voltage. Responsive to the assert fault indication, the fault circuitry uses the fuse circuitry to disconnect the power source from components of converter circuitry, as well as downstream circuitry.

In some examples, the fault circuitry receives power from the power source through the fuse circuitry. In such examples, the fuse circuitry deactivates (e.g., powers off) the fault circuitry responsive to the assert fault indication. The fuse circuitry continues to prevent the fault circuitry from receiving power until the fuse circuitry reconnects the power source to the converter circuitry, which occurs after a system reset or power cycle. Directly connecting the fault circuitry to the power source, thus routing around the fuse circuitry, prevents the need to perform a system reset or power cycle to restore power to the fault circuitry. However, implementing such a design adds an additional supply pin, which needs to be capable of receiving the voltages of the power source. Such an additional pin increases the cost, size, and complexity of implementing fault circuitry.

Examples described herein include methods and apparatus to disconnect circuitry responsive to a fault condition using fault latch circuitry. In some described examples, the fault circuitry includes fault detection circuitry, fault latch circuitry, and pull-down circuitry. The fault detection circuitry generates an assert fault indication responsive to detecting a fault condition. The fault latch circuitry receives an enable voltage, which may be a stepped down representation of a voltage of a power source, from a power source. The fault latch circuitry generates a latch supply voltage responsive to receiving the enable voltage. The fault latch circuitry generates a fault gate indication using the latch supply voltage by latching the assert fault indication. The pull-down circuitry controls the fuse circuitry responsive to the fault gate circuitry. Advantageously, because the fault latch circuitry generates a latch supply voltage from the enable voltage received on an existing pin, a separate pin for a separate voltage is not needed to power the fault latch circuitry.

In such described examples, the fault latch circuitry includes open loop regulator circuitry, voltage clamp circuitry, level shifter circuitry, latch circuitry, latch safety circuitry, supply rail monitor circuitry, and latch reset circuitry. The open loop regulator circuitry generates the latch supply voltage responsive to the enable voltage. The voltage clamp circuitry prevents the latch supply voltage from exceeding a maximum voltage. The supply rail monitor circuitry prevents the fault gate indication from being set until the latch supply voltage is greater than a minimum voltage. The level shifter circuitry resets the fault gate indication responsive to a regulator circuitry indicating that the circuitry, which is being protected, is receiving power and the latch supply voltage is less than the minimum voltage. The latch reset circuitry holds the fault gate indication to a reset state responsive to indications from the supply rail monitor circuitry or the level shifter circuitry. The latch circuitry sets the fault gate indication by latching the assert fault indication. Advantageously, the fault latch circuitry efficiently (e.g., having a low quiescent current) controls fuse circuitry by latching assert fault indications.

FIG. 1 is a block diagram of an example system 100. In the example of FIG. 1, the system 100 includes a power source 120, converter circuitry 130, regulator circuitry 140, communication circuitry 150, and a USB port 160. In some examples, the USB port 160 connects the system 100 to external circuitry. In some examples, the system 100 is a part of a vehicle. In such examples, the system 100 is a part of an electronic control unit (ECU). In other examples, the system 100 is a part of an industrial control unit.

The power source 120 is coupled to the converter circuitry 130 and the regulator circuitry 140. In some examples, the power source 120 is an energy storage device, such as a battery with a supply voltage that decreases as the energy storage device discharges. In one example, when the power source 120 is fully charged, the supply voltage is approximately twelve and a half volts (V). However, when the power source 120 is almost fully discharged, the supply voltage is approximately equal to eleven and a half volts. In another example, when the power source 120 is fully charged, the supply voltage is approximately five and a half volts (V). However, when the power source 120 is almost fully discharged, the supply voltage is approximately equal to one and four-tenths volts. In yet another example, when the power source 120 is fully charged, the supply voltage is approximately twenty-four volts (V). However, when the supply is being charged, the voltage can increase to approximately thirty-six volts. In such examples, the converter circuitry 130 and the regulator circuitry 140 account for variations in the supply voltage as the power source 120 charges or discharges.

The converter circuitry 130 has an input terminal coupled to the power source 120 and the regulator circuitry 140 and an output terminal coupled to the USB port 160. In some examples, the converter circuitry 130 generates an output voltage that is less than an input voltage. In such examples, the converter circuitry 130 is referred to as buck converter circuitry. In other examples, the converter circuitry 130 generates the output voltage that is greater than the input voltage. In such examples, the converter circuitry 130 is referred to as boost converter circuitry. In yet another example, the converter circuitry 130 may generate the output voltage either greater than or less than the input voltage. In such examples, the converter circuitry 130 is referred to as buck-boost converter circuitry. An example of the converter circuitry 130 is illustrated and described in connection with FIG. 2, below.

The regulator circuitry 140 has an input terminal coupled to the power source 120 and the converter circuitry 130 and an output terminal coupled to the communication circuitry 150. In some examples, the regulator circuitry 140 uses feedback loops (e.g., closed loop circuitry) to generate the output voltage. For example, the regulator circuitry 140 may be linear regulator circuitry, which utilizes an error amplifier, a transistor, and resistor ladder to generate the output voltage. In such examples, the error amplifier regulates the current trough the transistor responsive to feedback from the resistor ladder.

The communication circuitry 150 has a first terminal coupled to the regulator circuitry 140, a second terminal coupled to the USB port 160, and a third terminal that may be coupled to external circuitry, which interfaces with the USB port 160 by the communication circuitry 150. The USB port 160 has a first terminal coupled to the converter circuitry 130 and a second terminal coupled to the communication circuitry 150. The USB port 160 couples the system 100 to external circuitry by a USB connector (not illustrated).

In example operations, the power source 120 supplies a supply voltage to the converter circuitry 130 and the regulator circuitry 140. The converter circuitry 130 receives the supply voltage from the power source 120 as an input voltage (VIN). The converter circuitry 130 generates an output voltage (VOUT) responsive to the input voltage. In some examples, the converter circuitry 130 utilizes switching to control current through an inductance. During some operations, the converter circuitry 130 charges the inductor responsive to coupling the inductance to the input voltage, which generates a current in a first direction. During other operations, the converter circuitry 130 allows the inductance to discharge responsive to couple the inductance to a common potential, which generates a current in a second direction. In such examples, switching the supply of current to the inductance using switches allows the converter circuitry 130 to generate the output voltage.

In some examples, such as in FIG. 2, below, the converter circuitry 130 includes safety circuitry, such as fuse circuitry, to prevent a supply of power to the USB port 160 responsive to a fault condition being met. A fault condition occurs responsive to a determination that one or more terminals have values or states (e.g., voltages, currents, etc.) that are improperly set. When a fault condition occurs, the converter circuitry 130 asserts a fault condition to initialize safety operations. In such example conditions, the converter circuitry 130 reduces a likelihood of harmful operating conditions damaging components of the converter circuitry 130 or downstream circuitry. In some examples, the converter circuitry 130 controls fuse circuitry to prevent the power source 120 from supplying power to one or more components of the converter circuitry 130. In such examples, the converter circuitry 130 disables the supply of power to the one or more components responsive to detection of a fault condition.

In example operation, the regulator circuitry 140 receives the supply voltage from the power source 120. The regulator circuitry 140 regulates a supply of power from the power source 120 to supply an output voltage (VOUT) to the communication circuitry 150. The regulator circuitry 140 supplies the output voltage to the communication circuitry 150. The communication circuitry 150 receives the output voltage from the regulator circuitry 140 as a supply voltage. The communication circuitry 150 implements USB communication protocols to allow external circuitry, coupled to the USB port 160, to communicate with the system 100. In some examples, the communication circuitry 150 allows the external circuitry to interface with one or more operations of the system 100. For example, the communication circuitry 150 facilitates communications between external circuitry and an audio ECU to play audio from the external circuitry. In some examples, the USB port 160 supplies power to the external circuitry. In other examples, the USB port 160 supplies power to the external circuitry and allows the communication circuitry 150 to communicate with the external circuitry.

Figure 2:
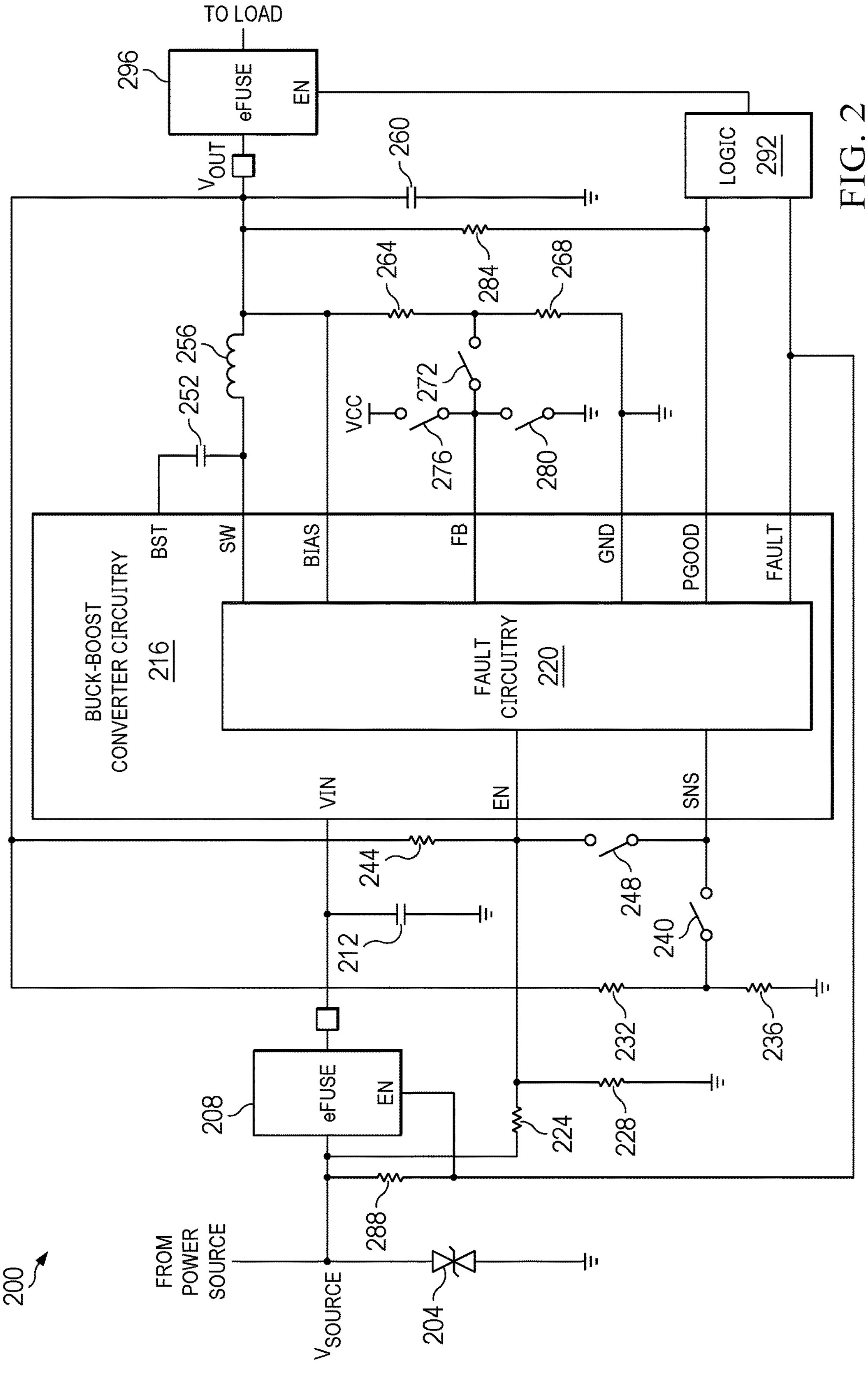
FIG. 2 is a schematic diagram of an example of the converter circuitry of FIG. 1 including example fault circuitry that controls example fuse circuitry by latching fault conditions.

FIG. 2 is a schematic diagram of example converter circuitry 200, which is an example of the converter circuitry 130 of FIG. 1. In the example of FIG. 2, the converter circuitry 200 includes a diode 204, first fuse circuitry 208, a first capacitor 212, buck-boost converter circuitry 216, fault circuitry 220, a first resistor 224, a second resistor 228, a third resistor 232, a fourth resistor 236, a first switch 240, a fifth resistor 244, a second switch 248, a second capacitor 252, an inductor 256, a third capacitor 260, a sixth resistor 264, a seventh resistor 268, a third switch 272, a fourth switch 276, a fifth switch 280, an eighth resistor 284, a ninth resistor 288, a logic device 292, and second fuse circuitry 296. The converter circuitry 200 receives a supply voltage as an input voltage (VIN). The converter circuitry 200 generates an output voltage (VOUT) using the buck-boost converter circuitry 216.

The diode 204 has a first terminal and second terminal. The first terminal of the diode 204 is coupled to the fuse circuitry 208, the resistors 224, 288, and that may be coupled to the power source 120 of FIG. 1, which supplies the supply voltage. The second terminal of the diode 204 is coupled to a common terminal, which supplies a common potential (e.g., ground). In the example of FIG. 2, the diode 204 is a transient voltage suppression diode (TVS). Alternatively, converter circuitry 200 may be modified to replace the diode 204 with alternative voltage clamp circuitry.

The fuse circuitry 208 has a first terminal, a second terminal, and an enable (EN) terminal. The first terminal of the fuse circuitry 208 is coupled to the diode 204, the resistors 224, 288, and may be coupled to the power source 120, which supplies the supply voltage. The second terminal of the fuse circuitry 208 is coupled to the buck-boost converter circuitry 216 and the capacitor 212. The enable terminal of the fuse circuitry 208 is coupled to the fault circuitry 220, the resistor 288, and the logic device 292. In the example of FIG. 2, the fuse circuitry 208 is an electronic fuse (eFuse). Alternatively, the fuse circuitry 208 may be modified or replaced with alternative circuitry to electrically disconnect the supply voltage from the buck-boost converter circuitry 216.

The capacitor 212 has a first terminal and a second terminal. The first terminal of the capacitor 212 is coupled to the fuse circuitry 208 and the buck-boost converter circuitry 216. The second terminal of the capacitor 212 is coupled to the common terminal, which supplies the common potential. In the example of FIG. 2, the capacitor 212 is structured as filter circuitry, which averages the output voltage to filter relatively high-frequency changes in the input voltage. In some examples, the capacitor 212 may be included or illustrated as part of the buck-boost converter circuitry 216.

The buck-boost converter circuitry 216 has a first terminal (VIN), a second terminal (EN), a third terminal (SNS), a fourth terminal (BST), a fifth terminal (SW), a sixth terminal (BIAS), a seventh terminal (FB), an eighth terminal (GND), a ninth terminal (PGOOD), and a tenth terminal (FAULT). The first terminal of the buck-boost converter circuitry 216 is coupled to the fuse circuitry 208 and the capacitor 212. The second terminal of the buck-boost converter circuitry 216 is coupled to the fault circuitry 220 and the resistors 224, 228. The third terminal of the buck-boost converter circuitry 216 is coupled to the fault circuitry 220 and the switches 240, 248. The fourth terminal of the buck-boost converter circuitry 216 is coupled to the capacitor 252. The fifth terminal of the buck-boost converter circuitry 216 is coupled to the fault circuitry 220, the capacitor 252, and the inductor 256. The sixth terminal of the buck-boost converter circuitry 216 is coupled to the fault circuitry 220, the resistors 232, 244, 284, 264, the inductor 256, the capacitor 260, and the fuse circuitry 296. The seventh terminal of the buck-boost converter circuitry 216 is coupled to the fault circuitry 220 and the switches 272, 276, 280. The eighth terminal of the buck-boost converter circuitry 216 is coupled to the common terminal, which supplies the common potential. The ninth terminal of the buck-boost converter circuitry 216 is coupled to the fault circuitry 220, the resistor 284, and the logic device 292. The tenth terminal of the buck-boost converter circuitry 216 is coupled to the fuse circuitry 208, the fault circuitry 220, the resistor 288, and the logic device 292. Alternatively in some examples, the converter circuitry 200 may be modified such that the buck-boost converter circuitry 216 may be replaced with buck converter circuitry, boost converter circuitry, etc.

The fault circuitry 220 has a first terminal, a second terminal, a third terminal, a fourth terminal, a fifth terminal, a sixth terminal, a seventh terminal, and a fault terminal. The first terminal of the fault circuitry 220 is coupled to the resistors 224, 228. The second terminal of the fault circuitry 220 is coupled to the switches 240, 248. The third terminal of the fault circuitry 220 is coupled to the capacitor 252 and the inductor 256. The fourth terminal of the fault circuitry 220 is coupled to the resistors 232, 244, 264, 284, the inductor 256, the capacitor 260, and the fuse circuitry 296. The fifth terminal of the fault circuitry 220 is coupled to the switches 272, 276, 280. The sixth terminal of the fault circuitry 220 is coupled to the common terminal, which supplies the common potential. The seventh terminal of the fault circuitry 220 is coupled to the resistor 284 and the logic device 292. The fault terminal of the fault circuitry 220 is coupled to the fuse circuitry 208, the resistor 288, and the logic device 292. In the example of FIG. 2, the fault circuitry 220 is internal to the buck-boost converter circuitry 216. Alternatively, the fault circuitry 220 may be external to the buck-boost converter circuitry 216.

The resistor 224 has a first terminal and a second terminal. The first terminal of the resistor 224 is coupled to the diode 204, the fuse circuitry 208, the resistor 288, and may be coupled to the power source 120, which supplies the supply voltage. The second terminal of the resistor 224 is coupled to the buck-boost converter circuitry 216, the fault circuitry 220, and the resistor 228. The resistor 228 has a first terminal and a second terminal. The first terminal of the resistor 228 is coupled to the buck-boost converter circuitry 216, the fault circuitry 220, and the resistor 224. The second terminal of the resistor 228 is coupled to the common terminal, which supplies the common potential. In the example of FIG. 2, the resistors 224, 228 are structured as voltage divider circuitry, which supplies an enable voltage to the fault circuitry 220. In some examples, the converter circuitry 200 may be modified to remove or replace the resistors 224, 228 with alternative voltage divider circuitry.

The resistor 232 has a first terminal and a second terminal. The first terminal of the resistor 232 is coupled to the resistors 244, 264, 284, the inductor 256, the capacitor 260, and the fuse circuitry 296. The second terminal of the resistor 232 is coupled to the resistor 236 and the switch 240. The resistor 236 has a first terminal and a second terminal. The first terminal of the resistor 236 is coupled to the resistor 232 and the switch 240. The second terminal of the resistor 236 is coupled to the common terminal, which supplies the common potential. The switch 240 has a first terminal and a second terminal. The first terminal of the switch 240 is coupled to the resistors 232, 236. The second terminal of the switch 240 is coupled to the buck-boost converter circuitry 216, the fault circuitry 220, and the switch 248. In the example of FIG. 2, the resistors 232, 236 are structured as voltage divider circuitry. When closed, the switch 240 couples a reference voltage resulting from the voltage divider circuitry of the resistors 232, 236 to the fault circuitry 220. In some examples, the converter circuitry 200 may be modified to remove or replace the resistors 232, 236 with alternative voltage divider circuitry.

The resistor 244 has a first terminal and a second terminal. The first terminal of the resistor 244 is coupled to the resistors 232, 264, 284, the inductor 256, the capacitor 260, and the fuse circuitry 296 and a second terminal coupled to the switch 248. The switch 248 has a first terminal and a second terminal. The first terminal of the switch 248 is coupled to the resistor 244. The second terminal of the switch 248 is coupled to the buck-boost converter circuitry 216, the fault circuitry 220, and the switch 240. In some examples, the converter circuitry 200 may be modified to remove or replace the resistors 232, 244 with alternative voltage divider circuitry.

The capacitor 252 has a first terminal and a second terminal. The first terminal of the capacitor 252 is coupled to the buck-boost converter circuitry 216. The second terminal of the capacitor 252 is coupled to the buck-boost converter circuitry 216, the fault circuitry 220, and the inductor 256.

The inductor 256 has a first terminal and a second terminal. The first terminal of the inductor 256 is coupled to the buck-boost converter circuitry 216, the fault circuitry 220, and the capacitor 252. The second terminal of the inductor 256 is coupled to the resistors 232, 244, 264, 284, the inductor 256, the capacitor 260, and the fuse circuitry 296. In some examples, the inductor 256 may be included or illustrated as part of (e.g., internal to) the buck-boost converter circuitry 216.

The capacitor 260 has a first terminal and a second terminal. The first terminal of the capacitor 260 is coupled to the resistors 232, 244, 264, 284, the inductor 256, and the fuse circuitry 296. The second terminal of the capacitor 260 is coupled to the common terminal, which supplies the common potential. In the example of FIG. 2, the capacitor 260 is structured as filter circuitry, which averages the output voltage to filter relatively high-frequency changes in the output voltage. In some examples, the capacitor 260 may be included or illustrated as part of the buck-boost converter circuitry 216.

The resistor 264 has a first terminal and a second terminal. The first terminal of the resistor 264 is coupled to the resistors 232, 244, 284, the inductor 256, the capacitor 260, and the fuse circuitry 296. The second terminal of the resistor 264 is coupled to the resistor 268 and the switch 272. The resistor 268 has a first terminal and a second terminal. The first terminal of the resistor 268 is coupled to the resistor 264 and the switch 272. The second terminal of the resistor 268 is coupled to the common terminal, which supplies the common potential. The switch 272 has a first terminal and a second terminal. The first terminal of the switch 272 is coupled to the resistors 264, 268. The second terminal of the switch 272 is coupled to the buck-boost converter circuitry 216, the fault circuitry 220, and the switches 276, 280. In the example of FIG. 2, the resistors 264, 268 are structured as voltage divider circuitry. When closed, the switch 272 couples a reference voltage resulting from the voltage divider circuitry of the resistors 264, 268 to the fault circuitry 220. In some examples, the converter circuitry 200 may be modified to remove or replace the resistors 264, 268 with alternative voltage divider circuitry.

The switch 276 has a first terminal and a second terminal. The first terminal of the switch 276 is coupled to a supply terminal, which supplies a common collector voltage ($V_{CC}$). The second terminal of the switch 276 is coupled to the buck-boost converter circuitry 216, the fault circuitry 220, and the switches 272, 280. The switch 280 has a first terminal and a second terminal. The first terminal of the switch 280 is coupled to the buck-boost converter circuitry 216, the fault circuitry 220, and the switches 272, 276. The second terminal of the switch 280 is coupled to the common terminal, which supplies the common potential. In the example of FIG. 2, the switches 276, 280 are structured to supply one of the common collector voltage or the common potential to the fault circuitry 220.

The resistor 284 has a first terminal and a second terminal. The first terminal of the resistor 284 is coupled to the resistors 232, 244, 264, the inductor 256, the capacitor 260, and the fuse circuitry 296. The second terminal of the resistor 284 is coupled to the buck-boost converter circuitry 216, the fault circuitry 220, and the logic device 292. In the example of FIG. 2, the resistor 284 is structured as a step-down resistor, which allows the fault circuitry 220 to be configured to pull-down an input of the logic device 292.

The resistor 288 has a first terminal and a second terminal. The first terminal of the resistor 288 is coupled to the diode 204, the fuse circuitry 208, the resistor 224, and that may be coupled to the power source 120, which supplies the supply voltage. The second terminal of the resistor 288 is coupled to the fuse circuitry 208, the buck-boost converter circuitry 216, the fault circuitry 220, and the logic device 292. In the example of FIG. 2, the resistor 288 is structured as a step-down resistor, which allows the fault circuitry 220 to pull down the enable terminal of the fuse circuitry 208.

The logic device 292 has a first input terminal, a second input terminal, and an output terminal. The first input terminal of the logic device 292 is coupled to the buck-boost converter circuitry 216, the fault circuitry 220, and the resistor 284. The second input terminal of the logic device 292 is coupled to the fuse circuitry 208, the buck-boost converter circuitry 216, the fault circuitry 220, and the resistor 288, and an output terminal coupled to the fuse circuitry 296. In the example of FIG. 2, the logic device 292 is structured as an XOR gate, which allows the fault circuitry 220 to set the fuse circuitry 296.

The fuse circuitry 296 has a first terminal, a second terminal, and an enable terminal. The first terminal of the fuse circuitry 296 is coupled to the resistors 232, 244, 264, 284, the inductor 256, and the capacitor 260. The second terminal of the fuse circuitry 296 may be coupled to a load (e.g., the USB port 160 of FIG. 1). The enable terminal of the fuse circuitry 296 is coupled to the logic device 292. In the example of FIG. 2, the fuse circuitry 296 is an electronic fuse (eFuse). Alternatively, the fuse circuitry 296 may be modified or replaced with alternative circuitry to electrically disconnect the output voltage of the buck-boost converter circuitry 216 from the load.

In example operation, the diode 204 clamps the supply voltage to a maximum voltage responsive to the supply voltage being greater than the maximum voltage. In such example operations, the fuse circuitry 208 is a safety component that controls the supply of power to the buck-boost converter circuitry 216. When the enable terminal of the fuse circuitry 208 receives a first value (e.g., a logic high, a voltage greater than a threshold, etc.), the fuse circuitry 208 supplies the supply voltage to the capacitor 212 and the buck-boost converter circuitry 216.

The buck-boost converter circuitry 216 regulates current through the inductor 256 to generate the output voltage. In example operations, referred to as boost operations, the buck-boost converter circuitry 216 generates an output voltage that is greater than the input voltage. In other example operations, referred to as buck operations, the buck-boost converter circuitry 216 generates an output voltage that is less than the input voltage. In both examples, the buck-boost converter circuitry 216 determines whether to charge or discharge the inductor 256 responsive to a feedback voltage from one of the switches 272, 276, 280.

In example operations, when the switches 240, 272 are closed and the switches 248, 280, 276 are open, the resistors 232, 236 are structured as first voltage divider circuitry and the resistors 264, 268 are structured as second voltage divider circuitry. In such example operations, the output voltage of the converter circuitry 200 is a regulated voltage responsive to the buck-boost converter circuitry 216 operating as closed-loop circuitry. The second voltage divider circuitry of the resistors 264, 268 generates a feedback voltage (VFB) that is proportional to the output voltage and the first voltage divider circuitry of the resistors 232, 236 determines a sense voltage (VSNS) of the third terminal of the buck-boost converter circuitry 216. The sense voltage is proportional to the feedback voltage. In such example operations, the fault circuitry 220 receives both the feedback voltage and the sense voltage for fault conditions. Advantageously, the fault circuitry 220 may detect fault conditions of the feedback voltage using the sense voltage.

In other example operations, when the switches 240, 280, 272 are open and the switches 248, 276 are closed, the resistor 244 sets the sense voltage based on a bias voltage (VBIAS) at the sixth terminal of the buck-boost converter circuitry 216. In such example operations, the output voltage of the converter circuitry 200 is a fixed voltage and the buck-boost converter circuitry 216 operates as open-loop circuitry. In some examples, the fault circuitry 220 has a first internal resistance coupled to the sixth terminal (BIAS) of the buck-boost converter circuitry 216 and a second internal resistance coupled to the third terminal (SNS) of the buck-boost converter circuitry 216. In such examples, when the resistor 244 couples the first and second internal resistances of the fault circuitry 220, the internal resistances of the fault circuitry 220 and the resistor 244 are structured as voltage divider circuitry. Such voltage divider circuitry sets the bias voltage and sets the output voltage to a fixed value, which the fault circuitry 220 monitors for fault conditions. Advantageously, when the converter circuitry 200 is configured for a fixed output voltage, the fault circuitry 220 uses internal resistances to monitor the output voltage for fault conditions.

In example operation, the fault circuitry 220 receives an enable voltage as a reference voltage from the resistors 224, 228. The resistors 224, 228 step down the supply voltage to generate the enable voltage. In such example operations, the resistors 224, 228 continue to supply the enable voltage to the fault circuitry 220 independent of the state of the fuse circuitry 208. The fault circuitry 220 uses the enable voltage to monitor fault conditions and control the fuse circuitry 208, 296. The fault circuitry 220 monitors fault conditions by comparing received voltages to different values (e.g., states, voltages, etc.). For example, the fault circuitry 220 determines whether the resistors 232, 236 supply a sense voltage is equal to the common potential, the common collector voltage, a floating value, or a reset value. In such examples, the fault circuitry 220 determines a fault condition is met responsive to the sense voltage being equal to a value that is not intended during the example operations. Additional fault conditions are further described in connection with FIG. 3, below.

In example operations, the fault circuitry 220 latches a fault assert signal responsive to determining a fault condition is met. In such example operations, the fault circuitry 220 pulls-down the enable terminal of the fuse circuitry 208 responsive to latching the fault assert signal. The fuse circuitry 208 disconnects the supply voltage from the buck-boost converter circuitry 216 responsive to the fault circuitry 220 pulling down the enable terminal of the fuse circuitry 208. After the fuse circuitry 208 disconnects the supply voltage from the buck-boost converter circuitry 216, the fault circuitry 220 continues to hold the fault status using the enable voltage. The fault circuitry 220 may release the enable terminal of the fuse circuitry 208 responsive to determining a detected fault condition is no longer present.

Advantageously, the fault circuitry 220 still receives the enable voltage when the fuse circuitry 208 is not supplying the supply voltage to the buck-boost converter circuitry 216. Advantageously, the fault circuitry 220 may continue to monitor for fault conditions when the fuse circuitry 208 is not supplying the supply voltage to the buck-boost converter circuitry 216. Advantageously, the fault circuitry 220 may allow the fuse circuitry 208 to resume supplying the supply voltage to the buck-boost converter circuitry 216 after pulling down the enable terminal of the fuse circuitry 208.

Figure 3:
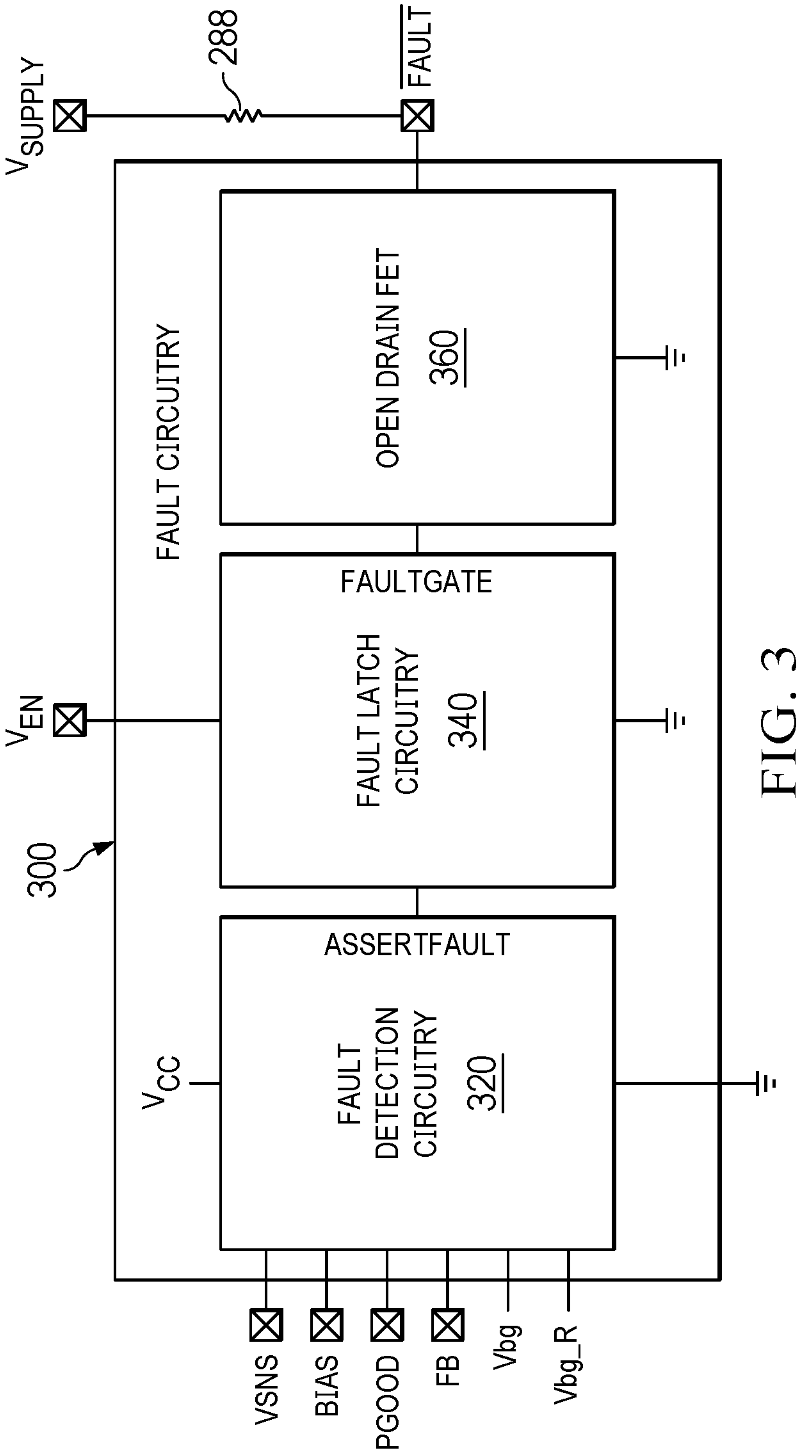
FIG. 3 is a block diagram of an example of the fault circuitry of FIG. 2 including example fault latch circuitry that sets a latch responsive to example fault detection circuitry detecting a fault condition.

FIG. 3 is a block diagram of example fault circuitry 300, which is an example of the fault circuitry 220 of FIG. 2. In the example of FIG. 3, the fault circuitry 300 includes fault detection circuitry 320, fault latch circuitry 340, and an open drain field effect transistor (FET) 360. The fault circuitry 300 monitors terminals of the buck-boost converter circuitry 216 of FIG. 2 to detect fault conditions. Fault conditions occur when one or more of the terminals of the buck-boost converter circuitry 216 are in a non-intended state. When a fault condition occurs, the fault circuitry 300 pulls down the enable terminal of the fuse circuitry 208 of FIG. 2 to prevent further operations of the buck-boost converter circuitry 216. Advantageously, the fault circuitry 300 reduces a likelihood of exposing the buck-boost converter circuitry 216 to harmful operating conditions that may damage components of the converter circuitry 200 of FIG. 2.

The fault detection circuitry 320 has a first terminal (VSNS), a second terminal (BIAS), a third terminal (PGOOD), a fourth terminal (FB), a fifth terminal (Vbg), a sixth terminal (Vbg_R), a seventh terminal, and an eighth terminal. The first terminal of the fault detection circuitry 320 may be coupled to the switches 240, 248 of FIG. 2. The second terminal of the fault detection circuitry 320 may be coupled to the resistors 232, 244, 264, 284, the inductor 256, the capacitor 260, and the fuse circuitry 296. The third terminal of the fault detection circuitry 320 may be coupled to the resistor 284 and the logic device 292. The fourth terminal of the fault detection circuitry 320 may be coupled to the switches 272, 276, 280. The fifth and sixth terminals of the fault detection circuitry 320 may be coupled to components internal to the buck-boost converter circuitry 216. The seventh terminal of the fault detection circuitry 320 is coupled to a supply terminal, which supplies the common collector voltage. The eighth terminal of the fault detection circuitry 320 is coupled to a common terminal, which supplies a common potential (e.g., ground). In the example of FIG. 3, the fault detection circuitry 320 is structured to monitor different terminals of the converter circuitry 200 to determine fault conditions. In some examples, the fault detection circuitry 320 may alternatively be coupled to one or more different connections of the converter circuitry 200.

The fault latch circuitry 340 has a first terminal, a second terminal, a third terminal, and a fourth terminal. The first terminal of the fault latch circuitry 340 is coupled to the fault detection circuitry 320. The second terminal of the fault latch circuitry 340 is coupled to the open drain FET 360. The third terminal of the fault latch circuitry 340 is coupled to the common terminal, which supplies the common potential. The fourth terminal of the fault latch circuitry 340 may be coupled to the resistors 224, 228 of FIG. 2, which supply the enable voltage ($V_{EN}$). In the example of FIG. 3, the fault latch circuitry 340 is structured to receive the enable voltage despite the state of the fuse circuitry 208. An example of the fault latch circuitry 340 is illustrated and described in connection with FIGS. 4 and 5, below.

The open drain FET 360 has a first terminal, a second terminal, and a third terminal. The first terminal of the open drain FET 360 is coupled to the fault latch circuitry 340. The second terminal of the open drain FET 360 may be coupled to the fuse circuitry 208, the resistor 288 of FIG. 2, and the logic device 292 of FIG. 2. The third terminal of the open drain FET 360 is coupled to the common terminal, which supplies the common potential. In the example of FIG. 3, the open drain FET 360 is structured to pull-down the enable terminal of the fuse circuitry 208 responsive to the fault latch circuitry 340 latching a fault condition. In such an example, the open drain FET 360 continues to pull-down the enable terminal of the fuse circuitry 208 after the buck-boost converter circuitry 216 no longer receives the supply voltage. Alternatively, the open drain FET 360 may be modified or replaced with alternative circuitry capable of setting the enable terminal of the fuse circuitry 208 responsive to the fault latch circuitry 340.

In example operation of the fault circuitry 300, the fault detection circuitry 320 receives voltages of the terminals coupled to the components of the converter circuitry 200. The fault detection circuitry 320 compares the received voltages to different possible states. In some examples, the state of a given terminal is determined to be one of the common potential, the common collector voltage, a float state, or a reset state. In such examples, the fault detection circuitry 320 determines the state of a given terminal by comparing the received voltages to values representing each state. For example, the fault detection circuitry 320 determines a terminal corresponds to the common potential responsive to determining a voltage of the terminal is equal to the common potential. In another example, the fault detection circuitry 320 determines a terminal corresponds to the common collector voltage responsive to determining a voltage of the terminal is equal to the common collector voltage.

In such example operations, the fault detection circuitry 320 compares the determined state of each terminal to a reference state of the terminal. The reference state specifies an ideal (e.g., target) state of the terminal at a given time. The fault detection circuitry 320 determines a fault condition is met responsive to the detecting a difference between the determined state and the ideal state of a terminal. The fault detection circuitry 320 generates an assert fault indication (ASSERTFAULT) responsive to detecting a fault condition is met. In some examples, the fault detection circuitry 320 sets the assert fault indication to a first state (e.g., a logical high, logic one, etc.) responsive to detecting a difference between the determined and ideal states of the terminals of the fault detection circuitry 320. In such examples, the fault detection circuitry 320 sets the assert fault indication to a second state (e.g., a logical low, logic zero, etc.) responsive to the determined and ideal states of the terminals of the fault detection circuitry 320 matching. The fault detection circuitry 320 supplies the assert fault indication to the fault latch circuitry 340.

In example operation, the fault latch circuitry 340 receives the enable voltage and the assert fault indication. In some examples, such as in FIG. 4, the fault latch circuitry 340 receives one or more additional safety indications (illustrated and described in connection with FIG. 5, below). In such examples, the one or more additional safety indications represent conditions of the converter circuitry 200 that correspond to operations that do not utilize the buck-boost converter circuitry 216. For example, the fault latch circuitry 340 may receive an initialization indication, which identifies when the converter circuitry 200 is undergoing initialization operations (e.g., loading memory cells). The fault latch circuitry 340 controls the open drain FET 360 by generating a fault gate indication (FAULTGATE). The fault latch circuitry 340 latches one of the assert fault indication or the additional safety indications responsive to receiving a value corresponding to a disconnect of the supply voltage from the buck-boost converter circuitry 216. The fault latch circuitry 340 may reset the fault gate indication responsive to a reset condition being met. A reset condition represents an operation of the converter circuitry 200 to correct the fault condition.

In such example operations, the fault latch circuitry 340 sets the fault gate indication to a first state (e.g., a logical high, logic one, etc.) responsive to one of the assert fault indication, which represents a fault condition being met, or an additional safety indication, which indicates a disconnect is needed. The open drain FET 360 pulls down the enable terminal of the fuse circuitry 208, 296 responsive to the fault latch circuitry 340 setting the fault gate indication to the first value. The fault latch circuitry 340 sets the fault gate indication to a second state (e.g., a logical low, logic zero, etc.) responsive to either the assert fault indication representing a fault condition being met or the one or more additional safety indications indicating a disconnect being needed. The open drain FET 360 allows the supply voltage and the output voltage to pull-up the enable terminal of the fuse circuitry 208, 296 responsive to the fault latch circuitry 340 setting the fault gate indication to the second value.

Advantageously, the fault latch circuitry 340 controls the open drain FET 360. Advantageously, the fault latch circuitry 340 continues to control the open drain FET 360 after the open drain FET 360 pulls-down the enable terminal of the fuse circuitry 208. Advantageously, the fault latch circuitry 340 may reset the fault gate indication to allow the fuse circuitry 208 to supply the supply voltage to the buck-boost converter circuitry 216.

Figure 4:
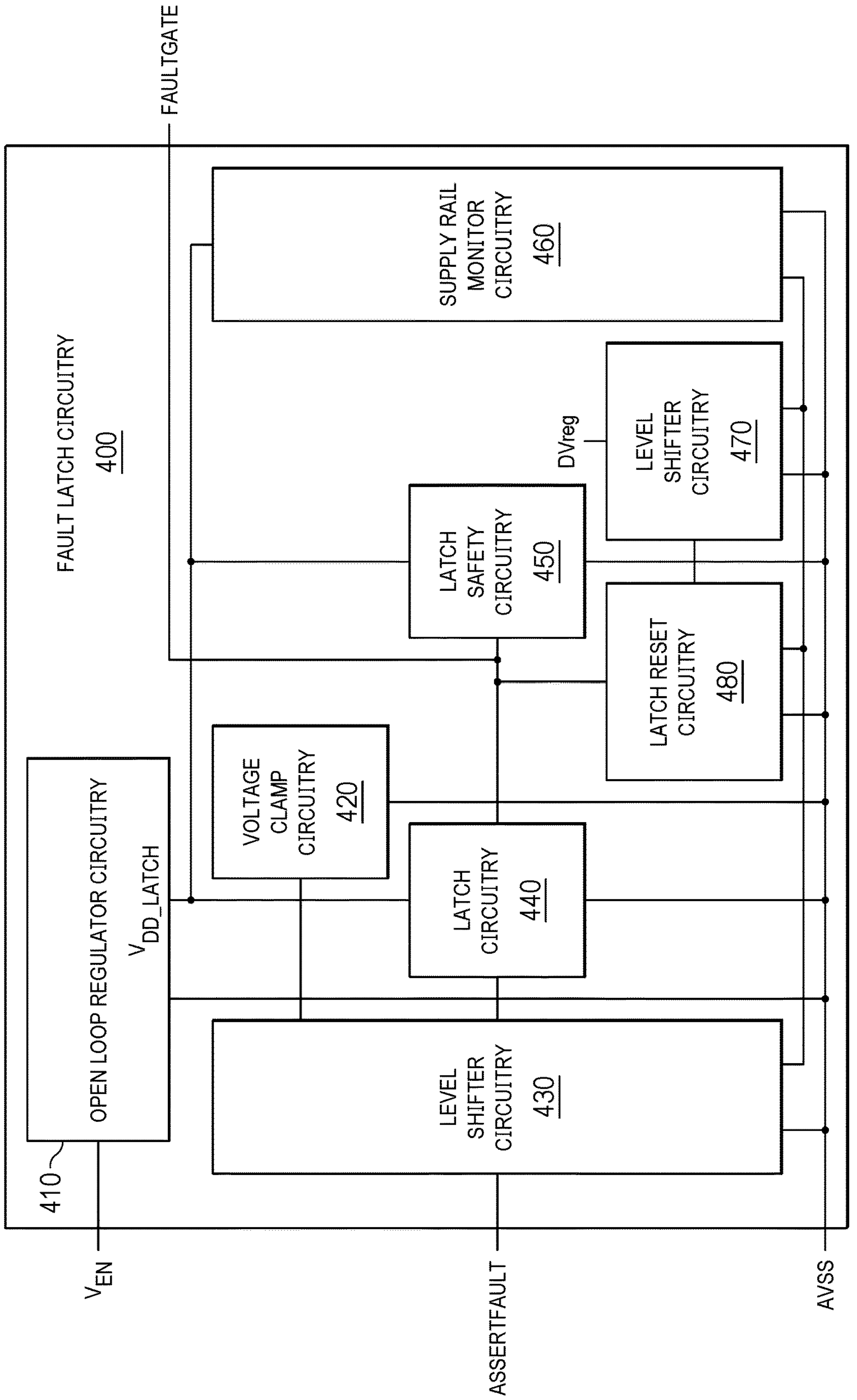
FIG. 4 is a block diagram of an example of the fault latch circuitry of FIG. 3.

FIG. 4 is a block diagram of example fault latch circuitry 400, which is an example of the fault latch circuitry 340 of FIG. 3. In the example of FIG. 4, the fault latch circuitry 400 includes open loop regulator circuitry 410, voltage clamp circuitry 420, first level shifter circuitry 430, latch circuitry 440, latch safety circuitry 450, supply rail monitor circuitry 460, second level shifter circuitry 470, and latch reset circuitry 480. The fault latch circuitry 400 receives the enable voltage from the resistors 224, 228 of FIG. 2 and the assert fault indication from the fault detection circuitry 320 of FIG. 3. The fault latch circuitry 400 controls the open drain FET 360 by generating the fault date indication (FAULTGATE) responsive to the assert fault indication indicating a fault condition is met.

The open loop regulator circuitry 410 has a first terminal, a second terminal, and a third terminal. The first terminal of the open loop regulator circuitry 410 may be coupled to the resistors 224, 228, which supply the enable voltage. The second terminal of the open loop regulator circuitry 410 is coupled to a common terminal, which supplies a common potential (e.g., AVSS). The third terminal of the open loop regulator circuitry 410 is coupled to the voltage clamp circuitry 420, the level shifter circuitry 430, the latch circuitry 440, the latch safety circuitry 450, and the supply rail monitor circuitry 460. An example of the open loop regulator circuitry 410 is illustrated and described in connection with FIG. 5, below.

The voltage clamp circuitry 420 has a first terminal and a second terminal. The first terminal of the voltage clamp circuitry 420 is coupled to the common terminal, which supplies the common potential. The second terminal of the voltage clamp circuitry 420 is coupled to the open loop regulator circuitry 410, the level shifter circuitry 430, the latch circuitry 440, the latch safety circuitry 450, and the supply rail monitor circuitry 460. An example of the voltage clamp circuitry 420 is illustrated and described in connection with FIG. 5, below.

The level shifter circuitry 430 has a first terminal, a second terminal, a third terminal, and a fourth terminal. The first terminal of the level shifter circuitry 430 is coupled to the open loop regulator circuitry 410, the voltage clamp circuitry 420, the latch circuitry 440, the latch safety circuitry 450, and the supply rail monitor circuitry 460. The second terminal of the level shifter circuitry 430 is coupled to the latch circuitry 440. The third terminal of the level shifter circuitry 430 is coupled to the common terminal, which supplies the common potential. The fourth terminal of the level shifter circuitry 430 is coupled to the supply rail monitor circuitry 460, the level shifter circuitry 470, and the latch reset circuitry 480. The fourth terminal of the level shifter circuitry 430 may be coupled to the fault detection circuitry 320. An example of the level shifter circuitry 430 is illustrated and described in connection with FIG. 5, below.

The latch circuitry 440 has a first terminal, a second terminal, a third terminal, and a fourth terminal. The first terminal of the latch circuitry 440 is coupled to the open loop regulator circuitry 410, the voltage clamp circuitry 420, the level shifter circuitry 430, the latch safety circuitry 450, and the supply rail monitor circuitry 460. The second terminal of the latch circuitry 440 is coupled to the common terminal, which supplies the common potential. The third terminal of the latch circuitry 440 is coupled to the latch safety circuitry 450, the latch reset circuitry 480, and that may be coupled to the open drain FET 360. The fourth terminal of the latch circuitry 440 is coupled to the latch reset circuitry 480. An example of the latch circuitry 440 is illustrated and described in connection with FIG. 5, below.

The latch safety circuitry 450 has a first terminal, a second terminal, and a third terminal. The first terminal of the latch safety circuitry 450 is coupled to the open loop regulator circuitry 410, the voltage clamp circuitry 420, the level shifter circuitry 430, the latch circuitry 440, and the supply rail monitor circuitry 460. The second terminal of the latch safety circuitry 450 is coupled to the common terminal, which supplies the common potential. The third terminal of the latch safety circuitry 450 is coupled to the latch circuitry 440, the latch reset circuitry, and that may be coupled to the open drain FET 360. An example of the latch safety circuitry 450 is illustrated and described in connection with FIG. 5, below.

The supply rail monitor circuitry 460 has a first terminal, a second terminal, and a third terminal. The first terminal of the supply rail monitor circuitry 460 is coupled to the open loop regulator circuitry 410, the voltage clamp circuitry 420, the level shifter circuitry 430, the latch circuitry 440, and the latch safety circuitry 450. The second terminal of the supply rail monitor circuitry 460 is coupled to the level shifter circuitry 430, 470 and the latch reset circuitry 480. The third terminal of the supply rail monitor circuitry 460 is coupled to the common terminal, which supplies the common potential. An example of the supply rail monitor circuitry 460 is illustrated and described in connection with FIG. 5, below.

The level shifter circuitry 470 has a first terminal, a second terminal, a third terminal, and a fourth terminal. The first terminal of the level shifter circuitry 470 is coupled to the latch reset circuitry 480. The second terminal of the level shifter circuitry 470 is coupled to the level shifter circuitry 430, the supply rail monitor circuitry 460, and the latch reset circuitry 480. The third terminal of the level shifter circuitry 470 is coupled to the common terminal, which supplies the common potential. The fourth terminal of the level shifter circuitry 470 is coupled to regulator supply rail circuitry, which supplies a regulator voltage (DVreg). An example of the level shifter circuitry 470 is illustrated and described in connection with FIG. 5, below.

The latch reset circuitry 480 has a first terminal, a second terminal, a third terminal, and a fourth terminal. The first terminal of the latch reset circuitry 480 is coupled to the latch circuitry 440, the latch safety circuitry 450, and may be coupled to the open drain FET 360. The second terminal of the latch reset circuitry 480 is coupled to the level shifter circuitry 430, 470 and the supply rail monitor circuitry 460. The third terminal of the latch reset circuitry 480 is coupled to the level shifter circuitry 470. The fourth terminal of the latch reset circuitry 480 is coupled to the common terminal, which supplies the common potential. An example of the latch reset circuitry 480 is illustrated and described in connection with FIG. 5, below.

In example operation, the open loop regulator circuitry 410 receives the enable voltage. In some examples, such as in FIG. 2, the resistors 224, 228 generate the enable voltage by stepping down the source voltage. The open loop regulator circuitry 410 generates a supply latch voltage ($V_{DD\_LATCH}$) responsive to receiving the enable voltage. The supply latch voltage corresponds to the power domain of the latch circuitry 440. In some examples, the open loop regulator circuitry 410 steps down the enable voltage to generate the supply latch voltage. For example, the open loop regulator circuitry 410 generates a supply latch voltage that is approximately equal to five volts (V) responsive to receiving an enable voltage equal to a voltage of sixty-five volts. The open loop regulator circuitry 410 supplies the supply latch voltage to the voltage clamp circuitry 420, the level shifter circuitry 430, the latch circuitry 440, the latch safety circuitry 450, and the supply rail monitor circuitry 460.

In example operation, the voltage clamp circuitry 420 receives the supply latch voltage. The voltage clamp circuitry 420 clamps the supply latch voltage to a maximum voltage when the open loop regulator circuitry 410 generates a supply latch voltage that is greater than the maximum voltage. The voltage clamp circuitry 420 prevents the supply latch voltage from being greater than the maximum voltage. The maximum voltage is the largest voltage where the fault latch circuitry 400 may safely operate.

In example operation, the level shifter circuitry 430 receives the supply latch voltage from the open loop regulator circuitry 410 and the assert fault indication from the fault detection circuitry 320. The level shifter circuitry 430 shifts the logic level of the assert fault indication from the power domain of the fault detection circuitry 320 to the power domain of the latch circuitry 440, which is set by the supply latch voltage. The level shifter circuitry 430 generates a set indication responsive to the logic level of the assert fault indication. In some examples, the level shifter circuitry 430 sets the set indication to a first state (e.g., a logical high, logic one, etc.) responsive to the assert fault indication being set to the first state. In such examples, the level shifter circuitry 430 sets the set indication to a second state (e.g., a logical low, logic zero, etc.) responsive to the assert fault indication being set to the second state. The level shifter circuitry 430 supplies the set indication to the latch circuitry 440.

In example operation, the latch circuitry 440 receives the latch supply voltage from the open loop regulator circuitry 410 and the set indication from the level shifter circuitry 430. The latch circuitry 440 generates the fault gate indication responsive to the set indication. In some examples, the latch circuitry 440 sets the fault gate indication to a first state (e.g., a logical high, logic one, etc.) responsive to the set indication being set to the first state. In such examples, the fault gate indication remains set to the first state until one of the latch safety circuitry 450 or the latch reset circuitry 480 reset the fault gate indication. The latch safety circuitry 450 and the latch reset circuitry 480 reset the fault gate indication by setting the fault gate indication to a second state (e.g., a logical low, logic zero, etc.). Advantageously, the latch circuitry 440 holds the fault gate indication to the first state until one of the latch safety circuitry 450 or the latch reset circuitry 480 set the fault gate indication to the second state.

In example operation, the latch safety circuitry 450 receives the latch supply voltage from the open loop regulator circuitry 410. The latch safety circuitry 450 resets the fault gate indication responsive to the latch supply voltage being less than a minimum voltage. The minimum voltage occurs when the enable voltage is not supplied to the fault latch circuitry 400. For example, if the power source 120 of FIG. 1 were disconnected. In some examples, the latch safety circuitry 450 sets the fault gate indication to the second state responsive to the latch supply voltage being less than the minimum voltage. In such examples, the latch supply voltage holds the fault gate indication at the second state until the latch supply voltage is greater than the minimum voltage. Advantageously, the latch safety circuitry 450 prevents the fault gate indication from being set when no enable voltage is being supplied to the fault latch circuitry 400.

In example operation, the supply rail monitor circuitry 460 receives the latch supply voltage from the open loop regulator circuitry 410. The supply rail monitor circuitry 460 generates a delay latch supply indication responsive to the latch supply voltage. The supply rail monitor circuitry 460 prevents the level shifter circuitry 430 and the latch circuitry 440 from setting the fault gate indication to the first value until the latch supply voltage is greater than a threshold voltage. In some examples, the supply rail monitor circuitry 460 sets the delay latch supply indication to a first state (e.g., a logical low, logic zero, etc.) responsive to the latch supply voltage being less than the threshold voltage. In such examples, the supply rail monitor circuitry 460 sets the delay latch supply indication to a second state (e.g., a logical high, logic one, etc.) responsive to the latch supply voltage being greater than the threshold voltage. The supply rail monitor circuitry 460 supplies the delay latch supply indication to the level shifter circuitry 430 and the latch reset circuitry 480. Advantageously, the supply rail monitor circuitry 460 prevents the latch circuitry 440 from latching the set indication when the latch supply voltage is less than a threshold voltage.

In example operation, the level shifter circuitry 470 receives a regulator voltage (DVreg) from the buck-boost converter circuitry 216. The regulator voltage is a voltage internal to the buck-boost converter circuitry 216. The buck-boost converter circuitry 216 generates the regulator voltage responsive to receiving the input voltage from the fuse circuitry 208. When the regulator voltage is greater than the common potential, the buck-boost converter circuitry 216 receives the supply voltage from the fuse circuitry 208. The level shifter circuitry 470 generates a converter enabled indication responsive to the regulator voltage. In some examples, the level shifter circuitry 470 sets the converter enabled indication to a first state (e.g., a logical high, logic one, etc.) responsive to the regulator voltage being greater than the common potential. In such examples, the level shifter circuitry 470 sets the converter enabled indication to a second state (e.g., a logical low, logic zero, etc.) responsive to the regulator voltage being approximately equal to the common potential. The level shifter circuitry 470 supplies the converter enabled indication to the latch reset circuitry 480. Advantageously, the level shifter circuitry 470 allows the fault latch circuitry 400 to set the fault gate indication when the enable voltage is not present.

In example operation, the latch reset circuitry 480 receives the delay latch supply indication from the supply rail monitor circuitry 460 and the converter enabled indication from the level shifter circuitry 470. The latch reset circuitry 480 holds the fault gate indication in the reset state responsive to the delay latch supply indication being set. Also, the latch reset circuitry 480 holds the fault gate indication in the reset state responsive to the converter enabled indication being set. Advantageously, the latch reset circuitry 480 holds the fault gate indication in the reset state until the latch supply rail voltage is greater than the threshold voltage or the buck-boost converter circuitry 216 does not generate the regulator voltage.

Figure 5:
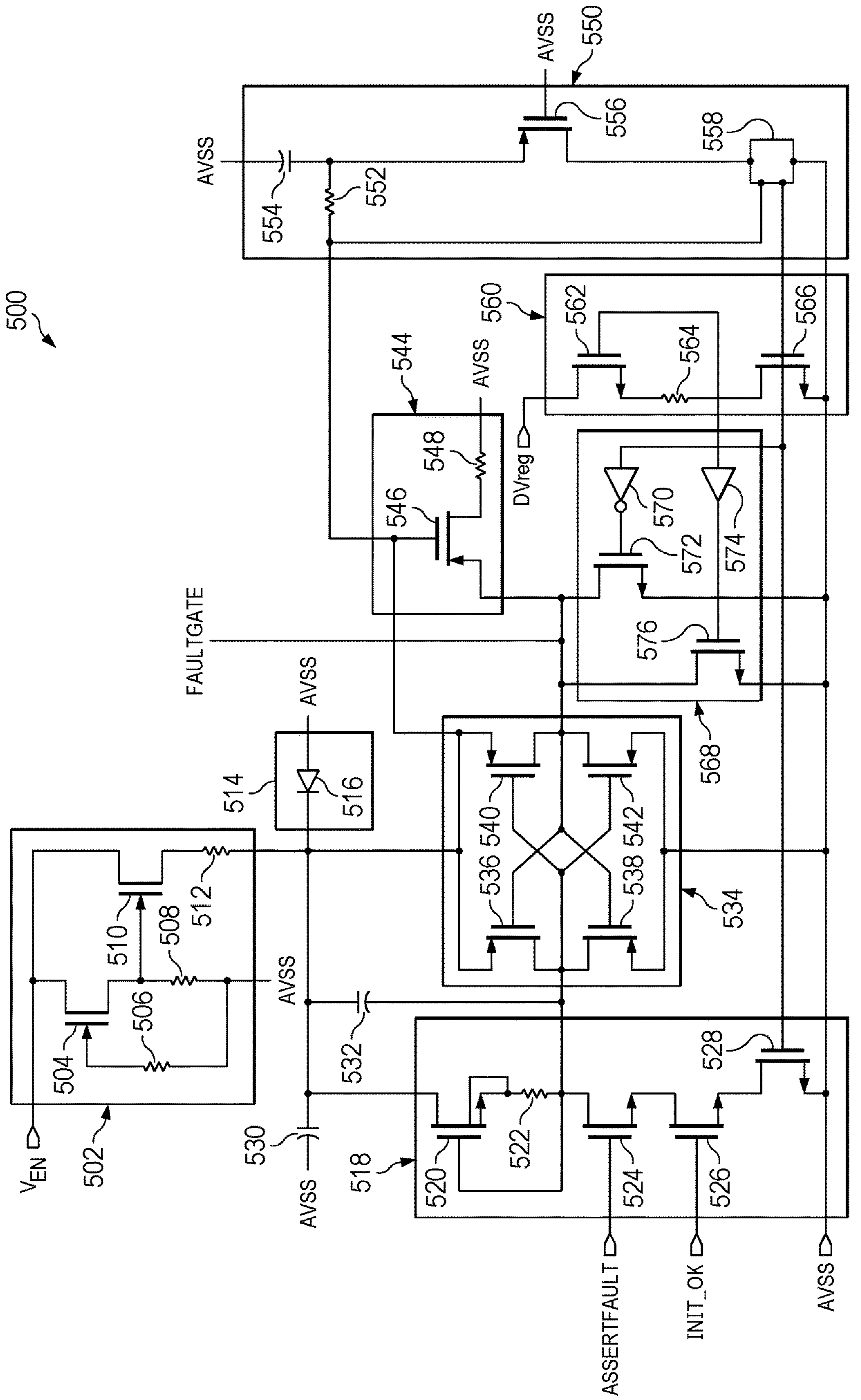
FIG. 5 is a schematic diagram of an example of the fault latch circuitry of FIGS. 3 and 4.

FIG. 5 is a schematic diagram of example fault latch circuitry 500, which is an example of the fault latch circuitry 340, 400 of FIGS. 3 and 4. In the example of FIG. 5, the fault latch circuitry 500 includes open loop regulator circuitry 502, a first transistor 504, a first resistor 506, a second resistor 508, a second transistor 510, a third resistor 512, voltage clamp circuitry 514, a diode 516, first level shifter circuitry 518, a third transistor 520, a fourth resistor 522, a fourth transistor 524, a fifth transistor 526, a sixth transistor 528, a first capacitor 530, a second capacitor 532, latch circuitry 534, a seventh transistor 536, an eighth transistor 538, a ninth transistor 540, a tenth transistor 542, latch safety circuitry 544, an eleventh transistor 546, a fifth resistor 548, supply rail monitor circuitry 550, a sixth resistor 552, a third capacitor 554, an eleventh transistor 556, a logic device 558, second level shifter circuitry 560, a twelfth transistor 562, a seventh resistor 564, a thirteenth transistor 566, latch reset circuitry 568, an inverter 570, a fourteenth transistor 572, a buffer 574, and a fifteenth transistor 576. The fault latch circuitry 500 receives the enable voltage from the resistors 224, 228 of FIG. 2 and the assert fault indication from the fault detection circuitry 320 of FIG. 3. In the example of FIG. 5, the fault latch circuitry 500 further receives an initialization indication (INIT_OK), which is an example additional safety indication. The fault latch circuitry 500 controls the open drain FET 360 by generating the fault date indication (FAULTGATE) responsive to the assert fault indication indicating a fault condition is met.

The open loop regulator circuitry 502 is coupled to an enable terminal, which supplies the enable voltage ($V_{EN}$), a common terminal, which supplies a common potential (e.g., AVSS), the voltage clamp circuitry 514, the level shifter circuitry 518, the capacitors 530, 532, the latch circuitry 534, the latch safety circuitry 544, and the supply rail monitor circuitry 550. In the example of FIG. 5, the open loop regulator circuitry 502 includes the transistors 504, 510 and the resistors 506, 508, 512. The open loop regulator circuitry 502 is an example of the open loop regulator circuitry 410 of FIG. 4.

The transistor 504 has a first terminal, a second terminal, and a control terminal. The first terminal of the transistor 504 is coupled to the transistor 510 and may be coupled to the resistor 224, 228, which supply the enable voltage. The second terminal of the transistor 504 is coupled to the resistor 508 and the transistor 510. The control terminal of the transistor 504 is coupled to the resistor 506. In the example of FIG. 5, the transistor 504 is a junction field effect transistor (JFET). Alternatively, with slight modifications the transistor 504 may be an n-channel metal-oxide semiconductor field-effect transistor (MOSFET), an n-channel field-effect transistor (FET), an n-channel insulated-gate bipolar transistors (IGBT), an NPN bipolar junction transistor (BJT) and/or, with slight modifications, a p-type equivalent device.

The resistor 506 has a first terminal and a second terminal. The first terminal of the resistor 506 is coupled to the transistor 504. The second terminal of the resistor 506 is coupled to the common terminal, which supplies the common potential. In the example of FIG. 5, the resistor 506 has a first resistance.

The resistor 508 has a first terminal and a second terminal. The first terminal of the resistor 508 is coupled to the transistors 504, 510. The second terminal of the resistor 508 is coupled to the common terminal, which supplies the common potential. In the example of FIG. 5, the resistor 508 has a second resistance.

The transistor 510 has a first terminal, a second terminal, and a control terminal. The first terminal of the transistor 510 is coupled to the transistors 504, 510. The second terminal of the transistor 510 is coupled to the resistor 512. The control terminal of the transistor 510 is coupled to the transistor 504 and the resistor 508. In the example of FIG. 5, the transistor 510 is a JFET. Alternatively, with slight modifications the transistor 510 may be an n-channel MOSFET, an n-channel FET, an n-channel IGBT, an NPN BJT and/or, with slight modifications, a p-type equivalent device.

The resistor 512 has a first terminal and a second terminal. The first terminal of the resistor 512 is coupled to the transistor 510. The second terminal of the resistor 512 is coupled to the voltage clamp circuitry 514, the level shifter circuitry 518, the capacitors 530, 532, the latch circuitry 534, the latch safety circuitry 544, and the supply rail monitor circuitry 550.

In example operation of the open loop regulator circuitry 502, the transistor 504 supplies a first current to the resistor 508 responsive to receiving the enable voltage. The transistor 510 supplies a second current to the resistor 512 responsive to receiving the enable voltage. The transistors 504, 510 allow for relatively high voltage differences between the enable voltage and the voltages at the resistors 508, 512. The resistor 512 generates the latch supply voltage responsive to receiving the current from the transistor 510. The latch supply voltage is proportional to the resistances of the resistors 506, 508, 512. The resistor 512 supplies the latch supply voltage to the voltage clamp circuitry 514, the level shifter circuitry 518, the latch circuitry 534, the latch safety circuitry 544, and the supply rail monitor circuitry 550. Advantageously, using JFETs or alternative depletion mode devices as the transistors 504, 510 reduces the quiescent current (IQ) and allows for relatively high voltage differences between the enable voltage and the latch supply voltage.

The voltage clamp circuitry 514 is coupled to the open loop regulator circuitry 502, the level shifter circuitry 518, the capacitors 530, 532, the latch circuitry 534, the latch safety circuitry 544, the supply rail monitor circuitry 550, and the common terminal, which supplies the common potential. In the example of FIG. 5, the voltage clamp circuitry 514 includes the diode 516. The voltage clamp circuitry 514 is an example of the voltage clamp circuitry 420 of FIG. 4.

The diode 516 has a first terminal and a second terminal. The first terminal of the diode 516 is coupled to the open loop regulator circuitry 502, the level shifter circuitry 518, the capacitors 530, 532, the latch circuitry 534, the latch safety circuitry 544, and the supply rail monitor circuitry 550. The second terminal of the diode 516 is coupled to the common terminal, which supplies the common potential. In the example of FIG. 5, the diode 516 is a Zener diode. Alternatively, the diode 516 may be replaced with an alternative type of diode or clamping circuitry.

In example operation of the voltage clamp circuitry 514, the diode 516 receives the latch supply voltage at a cathode of the diode 516. The diode 516 has a breakdown voltage, which represents a maximum voltage that may applied at the cathode of the diode 516. When the latch supply voltage exceeds the breakdown voltage of the diode 516, the diode 516 sets the latch supply voltage approximately equal to the common potential. In some examples, when the latch supply voltage exceeds the breakdown voltage of the diode 516, the diode 516 sets the latch supply voltage approximately equal to the common potential plus a reference voltage. Advantageously, the diode 516 prevents the open loop regulator circuitry 502 from generating a latch supply voltage greater than the breakdown voltage of the diode 516.

The level shifter circuitry 518 is coupled to the open loop regulator circuitry 502, the voltage clamp circuitry 514, the capacitors 530, 532, the latch circuitry 534, the latch safety circuitry 544, the supply rail monitor circuitry 550, the level shifter circuitry 560, the latch reset circuitry 568, and the common terminal, which supplies the common potential, and that may be coupled to the fault detection circuitry 320 of FIG. 3. In the example of FIG. 5, the level shifter circuitry 518 includes the transistors 520, 524, 526, 528 and the resistor 522. The level shifter circuitry 518 is an example of the level shifter circuitry 430 of FIG. 4.

The transistor 520 has a first terminal, a second terminal, a third terminal and a control terminal. The first terminal of the transistor 520 is coupled to the open loop regulator circuitry 502, the voltage clamp circuitry 514, the capacitors 530, 532, the latch circuitry 534, the latch safety circuitry 544, and the supply rail monitor circuitry 550. The second and third terminals of the transistor 520 are coupled to the resistor 522. The control terminal of the third transistor 520 is coupled to the resistor 522, the transistor 524, the capacitor 532, and the latch circuitry 534. In the example of FIG. 5, the transistor 520 is an n-channel MOSFET. Alternatively, with slight modifications the transistor 520 may be an n-channel JFET, an n-channel FET, an n-channel IGBT, an NPN BJT and/or, with slight modifications, a p-type equivalent device.

The resistor 522 has a first terminal and a second terminal. The first terminal of the resistor 522 is coupled to the transistor 520. The second terminal of the resistor 522 is coupled to the transistor 520, the capacitor 532, and the latch circuitry 534. In the example of FIG. 5, the resistor 522 is structured as a current limiting resistor, which prevents excessive currents resulting from coupling the latch supply voltage to the common potential.

The transistor 524 has a first terminal, a second terminal, and a control terminal. The first terminal of the transistor 524 is coupled to the transistor 520, the resistor 522, the capacitor 532, and the latch circuitry 534. The second terminal of the transistor 524 is coupled to the transistor 526. The control terminal of the transistor 524 may be coupled to the fault detection circuitry 320. In the example of FIG. 5, the transistor 524 is an n-channel MOSFET. Alternatively, with slight modifications the transistor 524 may be an n-channel JFET, an n-channel FET, an n-channel IGBT, an NPN BJT and/or, with slight modifications, a p-type equivalent device.

The transistor 526 has a first terminal, a second terminal, and a control terminal. The first terminal of the transistor 526 is coupled to the transistor 524. The second terminal of the transistor 526 is coupled to the transistor 528. The control terminal of the transistor 526 is coupled to an initialization compete terminal, which supplies an initialization complete indication. In the example of FIG. 5, the transistor 526 is an n-channel MOSFET. Alternatively, with slight modifications the transistor 526 may be an n-channel JFET, an n-channel FET, an n-channel IGBT, an NPN BJT and/or, with slight modifications, a p-type equivalent device.

The transistor 528 has a first terminal, a second terminal, and a control terminal. The first terminal of the transistor 528 is coupled to the transistor 526. The second terminal of the transistor 528 is coupled to the common terminal, which supplies the common potential. The third terminal of the transistor 528 is coupled to the supply rail monitor circuitry 550, the level shifter circuitry 560, and the latch reset circuitry 568. In the example of FIG. 5, the transistor 528 is an n-channel MOSFET. Alternatively, with slight modifications the transistor 528 may be an n-channel JFET, an n-channel FET, an n-channel IGBT, an NPN BJT and/or, with slight modifications, a p-type equivalent device.

In example operations of the level shifter circuitry 518, the assert fault indication from the fault detection circuitry 320 controls the transistor 524. An initialization indication (INIT_OK), which identifies when the converter circuitry 200 is undergoing initialization operations (e.g., loading memory cells). In the example of FIG. 5, the converter circuitry 200 sets the initialization indication to a first state (e.g., logical high, logic one, etc.) when initialization operations are being performed and the buck-boost converter circuitry 216 is not yet ready to generate the output voltage. In such an example, the converter circuitry 200 sets the initialization indication to a second state (e.g., logical low, logic zero, etc.) when the initialization operations are completed and the buck-boost converter circuitry 216 may begin producing the output voltage. The delay latch supply indication from the supply rail monitor circuitry 550 controls the transistor 528. Alternatively, one or more additional transistors may be coupled between the transistors 524, 528, such as the transistor 526, to support additional safety indications.

In example operation of the level shifter circuitry 518, the resistor 522 and the transistors 524, 526, 528 may set the state of a set indication. The resistor 522 generates a voltage, which sets the state of the set indication, responsive to at least one of the transistors 524, 526, 528 being off (e.g., not conducting, disabled, etc.). When at least one of the transistors 524, 526, 528 are off, the transistor 520 supplies current to the resistor 522, which sets the voltage of the set indication to a voltage approximately equal to the latch supply voltage (e.g., setting the state to a logical high). When the transistors 524, 526, 528 are on (e.g., conducting, enabled, etc.), the transistors 524, 526, 528 set the voltage of the set indication to a voltage approximately equal to the common potential (e.g., setting the state to a logical low). The level shifter circuitry 518 supplies the set indication to the capacitor 532 and the level shifter circuitry 534. Advantageously, the level shifter circuitry 518 allows the logic levels of the fault detection circuitry 320 to control setting the set indication to voltages of the fault latch circuitry 500.

The capacitor 530 has a first terminal and a second terminal. The first terminal of the capacitor 530 is coupled to the open loop regulator circuitry 502, the voltage clamp circuitry 514, the level shifter circuitry 518, the capacitor 532, the latch circuitry 534, the latch safety circuitry 544, and the supply rail monitor circuitry 550. The second terminal of the capacitor 530 is coupled to the common terminal, which supplies the common potential. In the example of FIG. 5, the capacitor 530 is structured as a decoupling capacitor, which reduces noise contributions between the common potential and the latch supply voltage.

The capacitor 532 has a first terminal and a second terminal. The first terminal of the capacitor 532 is coupled to the open loop regulator circuitry 502, the voltage clamp circuitry 514, the level shifter circuitry 518, the capacitor 530, the latch circuitry 534, the latch safety circuitry 544, and the supply rail monitor circuitry 550. The second terminal of the capacitor 532 is coupled to the level shifter circuitry 518 and the latch circuitry 534. In the example of FIG. 5, the capacitor 532 is a feedforward capacitor, which prevents latching between the set indication and the latch supply voltage at relatively high transients.

The latch circuitry 534 is coupled to the open loop regulator circuitry 502, the voltage clamp circuitry 514, the capacitors 530, 532, the latch safety circuitry 544, the supply rail monitor circuitry 550, the level shifter circuitry 560, the latch reset circuitry 568, and the common terminal, which supplies the common potential. In the example of FIG. 5, the latch circuitry 534 includes the transistors 536, 538, 540, 542. The latch circuitry 534 is an example of the latch circuitry 440 of FIG. 4.

The transistor 536 has a first terminal, a second terminal, and a control terminal. The first terminal of the transistor 536 is coupled to the open loop regulator circuitry 502, the voltage clamp circuitry 514, the level shifter circuitry 518, the capacitors 530, 532, the transistor 540, the latch safety circuitry 544, and the supply rail monitor circuitry 550. The second terminal of the transistor 536 is coupled to the level shifter circuitry 518, the capacitor 532, and the transistors 538, 540, 542. The control terminal of the transistor 536 is coupled to the transistors 538, 540, 542, the latch safety circuitry 544, and the latch reset circuitry 568. In the example of FIG. 5, the transistor 536 is a p-channel MOSFET. Alternatively, with slight modifications the transistor 536 may be a p-channel JFET, a p-channel FET, a p-channel IGBT, a PNP BJT and/or, with slight modifications, a n-type equivalent device.

The transistor 538 has a first terminal, a second terminal, and a control terminal. The first terminal of the transistor 538 is coupled to the level shifter circuitry 518, the capacitor 532, and the transistors 536, 540, 542. The second terminal of the transistor 538 is coupled to the common terminal, which supplies the common potential. The control terminal of the transistor 538 is coupled to the transistors 536, 540, 542, the latch safety circuitry 544, and the latch reset circuitry 568. In the example of FIG. 5, the transistor 538 is an n-channel MOSFET. Alternatively, with slight modifications the transistor 538 may be an n-channel JFET, an n-channel FET, an n-channel IGBT, an NPN BJT and/or, with slight modifications, a p-type equivalent device.

The transistor 540 has a first terminal, a second terminal, and a control terminal. The first terminal of the transistor 540 is coupled to the open loop regulator circuitry 502, the voltage clamp circuitry 514, the level shifter circuitry 518, the capacitors 530, 532, the transistor 540, the latch safety circuitry 544, and the supply rail monitor circuitry 550. The second terminal of the transistor 540 is coupled to the transistors 536, 538, 542, the latch safety circuitry 544, and the latch reset circuitry 568. The control terminal of the transistor 540 is coupled to the level shifter circuitry 518, the capacitor 532, and the transistors 536, 538, 542. In the example of FIG. 5, the transistor 540 is a p-channel MOSFET. Alternatively, with slight modifications the transistor 540 may be a p-channel JFET, a p-channel FET, a p-channel IGBT, a PNP BJT and/or, with slight modifications, a n-type equivalent device.

The transistor 542 has a first terminal, a second terminal, and a control terminal. The first terminal of the transistor 542 is coupled to the transistors 536, 538, 540, the latch safety circuitry 544, and the latch reset circuitry 568. The second terminal of the transistor 542 is coupled to the common terminal, which supplies the common potential. The control terminal of the transistor 542 is coupled to the level shifter circuitry 518, the capacitor 532, and the transistors 536, 538, 540. In the example of FIG. 5, the transistor 542 is an n-channel MOSFET. Alternatively, with slight modifications the transistor 542 may be an n-channel JFET, an n-channel FET, an n-channel IGBT, an NPN BJT and/or, with slight modifications, a p-type equivalent device.

In example operation of the latch circuitry 534, the transistors 536, 538, 540, 542 receive the set indication from the level shifter circuitry 518. The set indication controls the transistors 540, 542. The transistors 540, 542 set the state of the fault gate indication responsive to the state of the set indication. When the set indication has a voltage approximately equal to the latch supply voltage (e.g., a logical high, logic one, etc.), the set indication turns on the transistor 542, which sets the voltage of the fault gate indication to be approximately equal to the common potential (e.g., a logical low, logic zero, etc.). After the transistor 542 sets the voltage of the fault gate indication to be approximately equal to the common potential, the fault gate indication turns on the transistor 536, which latches the fault gate indication to the common potential. However, when the set indication has a voltage approximately equal to the common potential (e.g., a logical low, logic zero, etc.), the set indication turns on the transistor 540, which sets the voltage of the fault gate indication to be approximately equal to the latch supply voltage (e.g., a logical high, logic one, etc.). After the transistor 540 sets the voltage of the fault gate indication to be approximately equal to the latch supply voltage, the fault gate indication turns on the transistor 538, which latches the fault gate indication to the latch supply voltage. The transistors 540, 542 supply the fault gate indication to the open drain FET 360. Advantageously, the level shifter circuitry 518 sets the fault gate indication when the transistors 524, 526, 528 are turned off.

In such example operations of the latch circuitry 440, one of the latch safety circuitry 544 or the latch reset circuitry 568 may set the voltage of the fault gate indication to a voltage approximately equal to the common potential. After the one of the latch safety circuitry 544 or the latch reset circuitry 568 set the voltage of the fault gate indication to be approximately equal to the common potential, the fault gate indication turns on the transistor 536, which latches the fault gate indication to the common potential. Advantageously, the latch safety circuitry 544 and the latch reset circuitry 568 are capable of setting the fault gate indication to a state that resets the fault latch circuitry 500.

The latch safety circuitry 544 is coupled to the open loop regulator circuitry 502, the voltage clamp circuitry 514, the capacitors 530, 532, the latch circuitry 534, the supply rail monitor circuitry 550, the level shifter circuitry 560, the latch reset circuitry 568, and the common terminal, which supplies the common potential. In the example of FIG. 5, the latch safety circuitry 544 includes the transistor 546 and the resistor 548. The latch safety circuitry 544 is an example of the latch safety circuitry 450 of FIG. 4.

The transistor 546 has a first terminal, a second terminal, and a control terminal. The first terminal of the transistor 546 is coupled to the latch circuitry 534 and the latch reset circuitry 568. The second terminal of the transistor 546 is coupled to the resistor 548. The control terminal of the transistor 546 is coupled to the open loop regulator circuitry 502, the voltage clamp circuitry 514, the capacitors 530, 532, the latch circuitry 534, and the supply rail monitor circuitry 550. In the example of FIG. 5, the transistor 546 is a p-channel MOSFET. Alternatively, with slight modifications the transistor 546 may be a p-channel JFET, a p-channel FET, a p-channel IGBT, a PNP BJT and/or, with slight modifications, a n-type equivalent device.

The resistor 548 has a first terminal and a second terminal. The first terminal of the resistor 548 is coupled to the transistor 546. The second terminal of the resistor 548 coupled to the common terminal, which supplies the common potential. In the example of FIG. 5, the resistor 548 is structured as a pull-down resistor or current limiting resistor, which sets the fault gate indication to a voltage approximately equal to the common potential.

In example operation of the latch safety circuitry 544, the latch supply voltage and the fault gate indication control the transistor 546. The transistor 546 turns on responsive to the difference between the voltage of the fault gate indication and the latch supply voltage being greater than the threshold voltage of the transistor 546. For example, when the latch supply voltage is approximately equal to the common potential and the fault gate indication is greater than the common potential. In such an example, such voltages occur when an external voltage sets the fault gate indication, which indicates an error has occurred. Advantageously, the latch safety circuitry 544 improves reliability by ensuring that external voltages do not set the fault gate indication when the enable voltage is not being supplied (e.g., the converter circuitry 200 is not powered).

The supply rail monitor circuitry 550 is coupled to the open loop regulator circuitry 502, the voltage clamp circuitry 514, the capacitors 530, 532, the latch circuitry 534, the latch safety circuitry 544, the supply rail monitor circuitry 550, the level shifter circuitry 560, the latch reset circuitry 568, and the common terminal, which supplies the common potential. In the example of FIG. 5, the supply rail monitor circuitry 550 includes the resistor 552, the capacitor 554, the transistor 556, and the logic device 558. The supply rail monitor circuitry 550 is an example of the supply rail monitor circuitry 460 of FIG. 4.

The resistor 552 has a first terminal and a second terminal. The first terminal of the resistor 552 is coupled to the open loop regulator circuitry 502, the voltage clamp circuitry 514, the capacitors 530, 532, the latch circuitry 534, the latch safety circuitry 544, and the logic device 558. The second terminal of the resistor 552 is coupled to the capacitor 554 and the transistor 556. The capacitor 554 has a first terminal and a second terminal. The first terminal of the capacitor 554 is coupled to the resistor 552 and the transistor 556. The second terminal of the capacitor 554 is coupled to the common terminal, which supplies the common potential. In the example of FIG. 5, the resistor 552 and the capacitor 554 are structured as a resistor-capacitor (RC) circuit having a time constant, which is proportional to the resistance of the resistor 552 and the capacitance of the capacitor 554. In some examples, the supply rail monitor circuitry 550 may be modified to remove or replace the resistor 552 and the capacitor 554 with alternative circuitry having a time constant.

The transistor 556 has a first terminal, a second terminal, and a third terminal. The first terminal of the transistor 556 is coupled to the resistor 552 and the capacitor 554. The second terminal of the transistor 556 is coupled to the logic device 558. The control terminal of the transistor 556 is coupled to the common terminal, which supplies the common potential. In the example of FIG. 5, the transistor 556 is a p-channel MOSFET. Alternatively, with slight modifications the transistor 556 may be a p-channel JFET, a p-channel FET, a p-channel IGBT, a PNP BJT and/or, with slight modifications, a n-type equivalent device.

The logic device 558 has a first terminal, a second terminal, a third terminal, and a fourth terminal. The first terminal of the logic device 558 is coupled to the transistor 556. The second terminal of the logic device 558 is coupled to the level shifter circuitry 518, 560 and the latch reset circuitry 568. The third terminal of the logic device 558 is coupled to the common terminal, which supplies the common potential. The fourth terminal of the logic device 558 is coupled to the open loop regulator circuitry 502, the voltage clamp circuitry 514, the capacitors 530, 532, the latch circuitry 534, the latch safety circuitry 544, and the resistor 552. In the example of FIG. 5, the logic device 558 is a configurable buffer, which supplies one of the latch supply voltage or the common potential based on a voltage from the transistor 556.

In example operation of the supply rail monitor circuitry 550, the resistor 552 and the logic device 558 receive the latch supply voltage. The capacitor 554 begins charging responsive to the resistor 552 receiving the latch supply voltage. The rate at which the capacitor 554 charges is determined by the time constant of the RC circuit of the resistor 552 and the capacitor 554. When the voltage of the capacitor 554 is approximately equal to two times the threshold voltage of the transistor 556, the voltage of the capacitor 554 turns on the transistor 556.

In such example operation of the supply rail monitor circuitry 550, the logic device 558 supplies one of the common potential or the latch supply voltage to the level shifter circuitry 518, 560 and the latch reset circuitry 568 as the delay latch supply indication. When the transistor 556 is off, the logic device 558 sets the voltage of the delay latch supply indication approximately equal to the common potential. When the transistor 556 is on, the logic device 558 sets the voltage of the delay latch supply indication approximately equal to the latch supply voltage. Advantageously, the logic device 558 delays setting the voltage of the delay latch supply indication to the latch supply voltage until the resistor 552 charges the capacitor 554. Advantageously, the delay of the logic device 558 is configurable by the time constant of the RC circuit of the resistor 552 and the capacitor 554.

The level shifter circuitry 560 is coupled to the level shifter circuitry 518, the supply rail monitor circuitry 550, the latch reset circuitry 568, and the common terminal, which supplies the common potential. In the example of FIG. 5, the level shifter circuitry 560 includes the transistors 562, 566 and the resistor 564. The level shifter circuitry 560 is an example of the level shifter circuitry 470 of FIG. 4.

The transistor 562 has a first terminal, a second terminal, a third terminal, and a control terminal. The first terminal of the transistor 562 is coupled to a regulator terminal, which supplies a regulator voltage (DVreg). The second and third terminals of the transistor 562 are coupled to the resistor 564. The control terminal of the transistor 562 is coupled to the resistor 564, the transistor 566, and the latch reset circuitry 568. In the example of FIG. 5, the transistor 562 is an n-channel MOSFET. Alternatively, with slight modifications the transistor 562 may be an n-channel JFET, an n-channel FET, an n-channel IGBT, an NPN BJT and/or, with slight modifications, a p-type equivalent device.

The resistor 564 has a first terminal and a second terminal. The first terminal of the resistor 564 is coupled to the transistor 562. The second terminal of the resistor 564 is coupled to the transistors 562, 566 and the latch reset circuitry 568. In the example of FIG. 5, the resistor 564 is structured as a current limiting resistor, which prevents excessive currents resulting from coupling the regulator voltage to the common potential.

The transistor 566 has a first terminal, a second terminal, and a control terminal. The first terminal of the transistor 566 is coupled to the transistor 562 and the resistor 564. The second terminal of the transistor 566 is coupled to the common terminal, which supplies the common potential. The control terminal of the transistor 566 is coupled to the level shifter circuitry 518, the supply rail monitor circuitry 550, and the latch reset circuitry 568. In the example of FIG. 5, the transistor 562 is an n-channel MOSFET. Alternatively, with slight modifications the transistor 562 may be an n-channel JFET, an n-channel FET, an n-channel IGBT, an NPN BJT and/or, with slight modifications, a p-type equivalent device.

In example operation of the level shifter circuitry 560, the resistor 564 and the transistor 566 may set the state of the converter enabled indication. The resistor 564 sets a voltage of the converter enabled indication to be approximately equal to the regulator voltage, responsive to the delay latch supply indication turning off the transistor 566. When the delay latch supply indication turns on the transistor 566, the transistor 566 sets the voltage of the converter enabled indication to the common potential. The level shifter circuitry 560 supplies the converter enabled indication to the latch reset circuitry 568. Advantageously, the level shifter circuitry 560 sets the converter enabled indication when the delay latch supply indication does not indicate an enable voltage is present.

The latch reset circuitry 568 is coupled to the level shifter circuitry 518, 560, the latch circuitry 534, the latch safety circuitry 544, and the common terminal, which supplies the common potential. In the example of FIG. 5, the latch reset circuitry 568 includes the inverter 570, the transistors 572, 576, and the buffer 574. The latch reset circuitry 568 is an example of the latch reset circuitry 480 of FIG. 4.

The inverter 570 has a first terminal and a second terminal. The first terminal of the inverter 570 is coupled to the level shifter circuitry 518, 560 and the supply rail monitor circuitry 550. The second terminal of the inverter 570 is coupled to the transistor 572. The transistor 572 has a first terminal, a second terminal, and a control terminal. The first terminal of the transistor 572 is coupled to the latch circuitry 534, the latch safety circuitry 544, and the transistor 576. The second terminal of the transistor is coupled to the common terminal, which supplies the common potential. The control terminal of the transistor 572 is coupled to the inverter 570. In the example of FIG. 5, the transistor 572 is an n-channel MOSFET. Alternatively, with slight modifications the transistor 572 may be an n-channel JFET, an n-channel FET, an n-channel IGBT, an NPN BJT and/or, with slight modifications, a p-type equivalent device. In the example of FIG. 5, the inverter 570 and the transistor 572 are structured as switch circuitry, which is controlled by the delay latch supply indication. In some examples, the latch reset circuitry 568 may be modified to remove or replace the inverter 570 and the transistor 572 with alternative switching circuitry controlled by the delay latch supply indication.

The buffer 574 has a first terminal and a second terminal. The first terminal of the buffer 574 is coupled to the latch reset circuitry 568. The second terminal of the buffer 574 is coupled to the transistor 576. The transistor 576 has a first terminal, a second terminal, and a control terminal. The first terminal of the transistor 576 is coupled to the latch circuitry 534, the latch safety circuitry 544, and the transistor 572. The second terminal of the transistor 576 is coupled to the common terminal, which supplies the common potential. The control terminal of the transistor 576 coupled to the buffer 574. In the example of FIG. 5, the transistor 576 is an n-channel MOSFET. Alternatively, with slight modifications the transistor 576 may be an n-channel JFET, an n-channel FET, an n-channel IGBT, an NPN BJT and/or, with slight modifications, a p-type equivalent device. In the example of FIG. 5, the buffer 574 and the transistor 576 are structured as switch circuitry, which is controlled by the converter enabled indication. In some examples, the latch reset circuitry 568 may be modified to remove or replace the buffer 574 and the transistor 572 with alternative switching circuitry controlled by the converter enabled indication.

Figure 6:
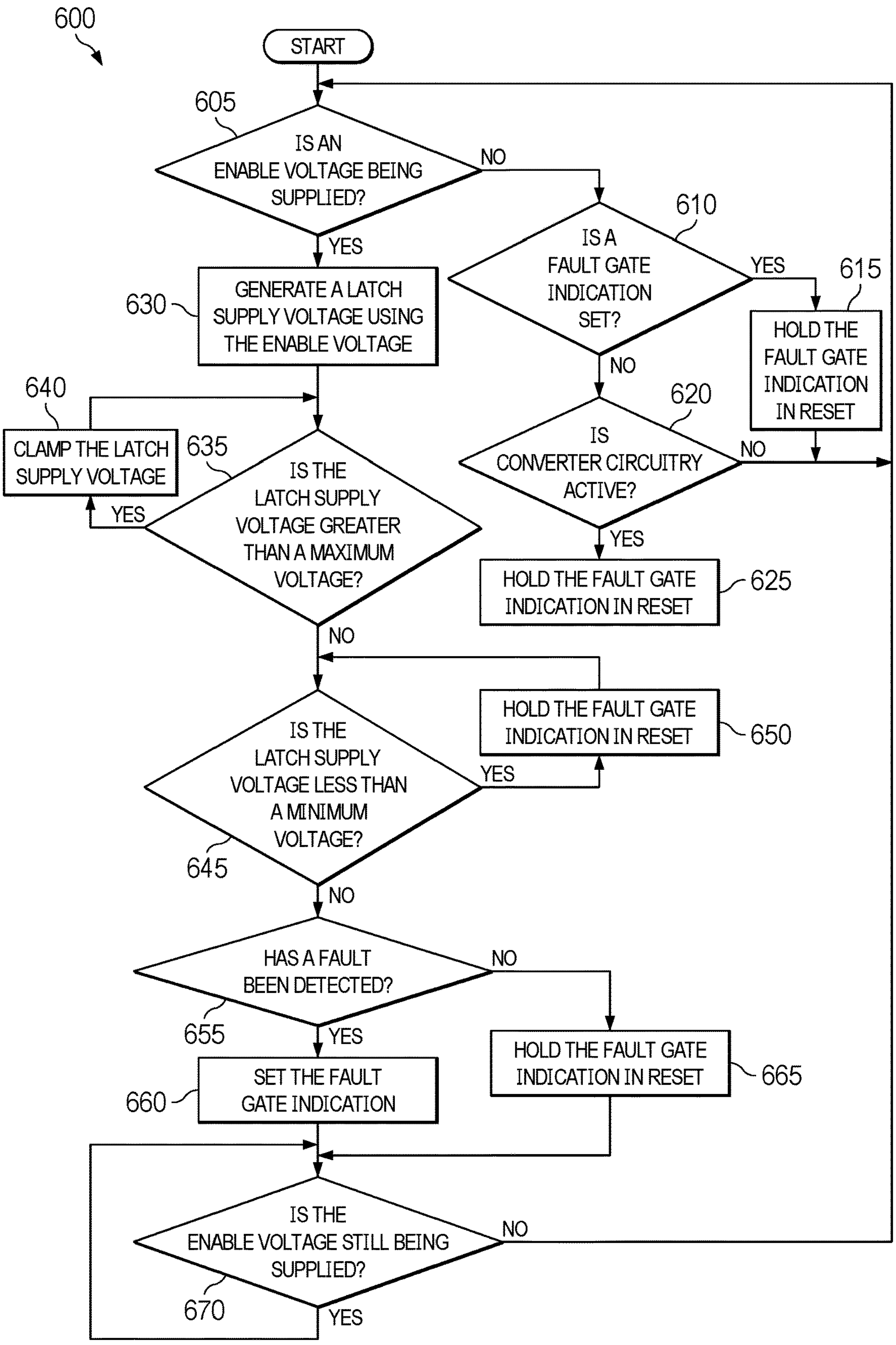
FIG. 6 is a flowchart representative of example operations that may be executed, instantiated, and/or performed to implement the fault latch circuitry of FIGS. 3, 4, and 5 and/or more generally the fault circuitry of FIGS. 2 and 3.

FIG. 6 is a flowchart representative of example operations 600 that may be executed, instantiated, and/or performed to implement the fault latch circuitry 340, 400, 500 of FIGS. 3, 4, and 5 and/or more generally the fault circuitry 220, 300 of FIGS. 2 and 3. In the example of FIG. 6, the operations 600 begin at Block 605, at which the open loop regulator circuitry 410, 502 of FIGS. 4 and 5 determine if an enable voltage is being received. (Block 605). In some examples, the transistors 504, 510 of FIG. 5 supply current responsive to receiving the enable voltage from the power source 120 of FIG. 1 and/or the resistors 224, 228 of FIG. 2.

When the open loop regulator circuitry 410, 502 do not receive the enable voltage (e.g., Block 605 returns a result of NO), the latch safety circuitry 450, 544 of FIGS. 4 and 5 determine if a fault gate indication is set. (Block 610). In some examples, the voltage difference between the latch supply voltage, which is generated responsive to receiving the enable voltage, and the voltage of the fault gate indication controls the transistor 546 of FIG. 5.

When the latch safety circuitry 450, 544 determine a fault gate indication is set (e.g., Block 610 returns a result or YES), the latch safety circuitry 450, 544 holds the fault gate indication in reset. (Block 615). In some examples, when the voltage difference between the latch supply voltage and the voltage of the fault gate indication turns on the transistor 546, the transistor 546 sets the fault gate indication approximately equal to the common potential. Control proceeds to return to Block 605.

When the open loop regulator circuitry 410, 502 do not receive the enable voltage (e.g., Block 605 returns a result of NO) and the latch safety circuitry 450, 544 determine that the fault gate indication is not set (e.g., Block 610 returns a result of NO), the level shifter circuitry 470, 560 of FIGS. 4 and 5 determines if converter circuitry is active. (Block 620). In some examples, the resistor 564 of FIG. 5 sets the voltage of the converter enabled indication responsive to the transistor 562 receiving the regulator voltage, which the buck-boost converter circuitry 216 of FIG. 2 generates responsive to an input voltage. When the level shifter circuitry 470, 560 determines that the converter circuitry is inactive (e.g., Block 620 returns a result of NO), control proceeds to return to Block 605.

When the level shifter circuitry 470, 560 determine that the converter circuitry is active (e.g., Block 620 returns a result of YES), the latch reset circuitry 480, 568 of FIGS. 4 and 5 holds the fault gate indication in reset. (Block 625). In some examples, the buffer 574 of FIG. 5 turns on the transistor 576 of FIG. 5 responsive to the level shifter circuitry 560 setting the converter enabled indication. Control proceeds to return to Block 605.

When the open loop regulator circuitry 410, 502 receives the enable voltage (e.g., Block 605 returns a result of YES), the open loop regulator circuitry 410, 502 generates a latch supply voltage responsive to the enable voltage. (Block 630). In some examples, the transistors 504, 510 supply current to the resistors 508, 512 of FIG. 5 responsive to the enable voltage creating drain-to-source voltage greater than approximately zero.

The voltage clamp circuitry 420, 514 of FIGS. 4 and 5 determine if the latch supply voltage is greater than a maximum voltage. (Block 635). In some examples, the diode 516 of FIG. 5 has a breakdown voltage, which represents the maximum voltage of the latch supply voltage.

When the voltage clamp circuitry 420, 514 determines that the latch supply voltage is greater than the maximum voltage (e.g., Block 635 returns a result of YES), the voltage clamp circuitry 420, 514 clamps the latch supply voltage. (Block 640). In some examples, the diode 516 breaks down responsive to the latch supply voltage being greater than the breakdown voltage of the diode 516. In such examples, the diode 516 sets the latch supply voltage approximately equal to the common potential. Control proceeds to return to Block 635.

When the voltage clamp circuitry 420, 514 determines that the latch supply voltage is not greater than the maximum voltage (e.g., Block 635 returns a result of NO), the supply rail monitor circuitry 460, 550 of FIGS. 4 and 5 determines if the latch supply voltage is less than a minimum voltage. (Block 645). In some examples, the resistor 552 of FIG. 5 charges the capacitor 554 of FIG. 5 to the latch supply voltage. However, when the latch supply voltage is less than the threshold voltage of the transistor 556, the logic device 558 holds the delay latch supply indication at the common potential.

When the supply rail monitor circuitry 460, 550 determines that the latch supply voltage is less than the minimum voltage (e.g., Block 645 returns a result of NO), the latch reset circuitry 480, 568 holds the fault gate indication in reset. (Block 650). Control proceeds to return to Block 645. In some examples, the inverter 570 of FIG. 5 inverts the voltage of the delay latch supply indication to turn on the transistor 572 of FIG. 5. In such examples, the transistor 572 sets the fault gate indication to the common potential.

When the supply rail monitor circuitry 460, 550 determines that the latch supply voltage is not less than the minimum voltage (e.g., Block 645 returns a result of YES), the level shifter circuitry 430, 518 of FIGS. 4 and 5 determines if a fault has been detected. (Block 655). In some examples, the resistor 522 of FIG. 5 sets the set indication to the latch supply voltage until the transistors 524, 526, 528 are turned on. In such examples, the assert fault indication from the fault detection circuitry 320 of FIG. 3 controls the transistor 524.

When the level shifter circuitry 430, 518 determines that a fault has been detected. (e.g., Block 655 returns a result of YES), the level shifter circuitry 430, 518 sets the fault gate indication. (Block 660). In some examples, when the assert fault condition turns on the transistor 524, the transistors 524, 526, 528 set the voltage of the set indication to the common potential. In such examples, the set indication turns on the transistor 540 of FIG. 5, which sets the voltage of the fault gate indication approximately equal to the latch supply voltage.

When the level shifter circuitry 430, 518 determines that a fault has not been detected. (e.g., Block 655 returns a result of NO), the level shifter circuitry 430, 518 holds the fault gate indication in reset. (Block 665). In some examples, when the assert fault condition fails to turn on the transistor 524, the transistor 520 and the resistor 522 set the set indication to the latch supply voltage. In such examples, the set indication fails to turn on the transistor 540, which keeps the voltage of the fault gate indication approximately equal to the common potential.

The latch circuitry 440, 534 of FIGS. 4 and 5 determines if the enable voltage is still being supplied. (Block 670). In some examples, the transistors 536, 538, 540, 542 latch the set indication from the level shifter circuitry 430, 518. In such examples, the transistors 536, 538, 540, 542 hold the fault gate indication until the latch supply voltage is no longer being supplied, which corresponds to the enable voltage no longer being supplied to the fault latch circuitry 340, 400, 500. When the latch circuitry 440, 534 determines that the enable voltage is still being supplied (e.g., Block 670 returns a result of YES), control proceeds to return to Block 670. When the latch circuitry 440, 534 determine that the enable voltage is not being supplied (e.g., Block 670 returns a result of NO), control proceeds to return to Block 605.

Although example methods are described with reference to the flowchart illustrated in FIG. 6 many other methods of implementing the fault latch circuitry 340, 400, 500 may alternatively be used in this description. For example, the order of execution of the blocks may be changed, and/or some of the blocks described may be changed, eliminated, or combined. Similarly, additional operations may be included in the manufacturing process before, in between, or after the blocks shown in the illustrated examples.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" refers to implementations including any of (1) at least one A, (2) at least one B, or (3) at least one A and at least one B. Similarly, as used herein in the context of describing structures, components, items, objects and/or things, the phrase "at least one of A or B" refers to implementations including any of (1) at least one A, (2) at least one B, or (3) at least one A and at least one B. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the described examples. In some examples, the descriptor "first" may be used to refer to an element in the detailed description, while the same element may be referred to in a claim with a different descriptor such as "second" or "third." In such instances, descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather also includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to structure the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface (s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

In the description and claims, described "circuitry" may include one or more circuits.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. An apparatus comprising:

a supply terminal;

fuse circuitry having a first terminal, a second terminal, and an enable terminal, the first terminal of the fuse circuitry coupled to the supply terminal;

fault circuitry having an enable terminal and a fault terminal, the enable terminal coupled to the supply terminal, the fault terminal coupled to the enable terminal of the fuse circuitry, the fault circuitry including circuitry having a power terminal coupled to the enable terminal and an output coupled to the fault terminal, the fault circuitry configurable to receive power from the enable terminal via the power terminal; and converter circuitry having a terminal coupled to the second terminal of the fuse circuitry.

2. The apparatus of claim 1, wherein the terminal of the converter circuitry is a first terminal, the converter circuitry further has a second terminal, the fault circuitry includes:

fault detection circuitry having a first terminal and a second terminal, the first terminal of the fault detection circuitry coupled to the second terminal of the converter circuitry;

fault latch circuitry having a first terminal, a second terminal, and a third terminal, the first terminal of the fault latch circuitry coupled to the power terminal, the second terminal of the fault latch circuitry coupled to the second terminal of the fault detection circuitry; and a transistor having a first terminal and a control terminal, the first terminal coupled to the enable terminal of the fuse circuitry via the fault terminal, the control terminal of the transistor coupled to the third terminal of the fault latch circuitry.

3. The apparatus of claim 2, wherein the fault latch circuitry includes:

open loop regulator circuitry having a first terminal and a second terminal, the first terminal of the open loop regulator circuitry coupled to the power terminal; and latch circuitry having a first terminal and a second terminal, the first terminal of the latch circuitry coupled to the second terminal of the open loop regulator circuitry, the second terminal of the latch circuitry coupled to the third terminal of the fault latch circuitry.

4. The apparatus of claim 3, wherein the latch circuitry further has a third terminal, and the fault latch circuitry further includes:

level shifter circuitry having a first terminal and a second terminal, the first terminal of the level shifter circuitry coupled to the third terminal of the latch circuitry; and voltage clamp circuitry having a terminal coupled to the second terminal of the open loop regulator circuitry, the first terminal of the latch circuitry, and the second terminal of the level shifter circuitry.

5. The apparatus of claim 1, wherein the fuse circuitry is first fuse circuitry, the terminal of the converter circuitry is a first terminal, the converter circuitry further having a second terminal, the apparatus further comprising:

a logic device having a first terminal and a second terminal, the first terminal of the logic device coupled to the enable terminal of the first fuse circuitry and the fault terminal of the fault circuitry; and second fuse circuitry having a first terminal and an enable terminal, the first terminal of the second fuse circuitry coupled to the second terminal of the converter circuitry, the enable terminal of the second fuse circuitry coupled to the second terminal of the logic device.

6. The apparatus of claim 1, further comprising:

a first resistor having a first terminal and a second terminal, the first terminal of the first resistor coupled to the supply terminal; and a second resistor having a first terminal and a second terminal, the first terminal of the second resistor coupled to the enable terminal of the fault circuitry and the second terminal of the first resistor, the second terminal of the second resistor coupled to a common potential.

7. The apparatus of claim 1, wherein the converter circuitry is one of buck converter circuitry, boost converter circuitry, or buck-boost converter circuitry.

8. An apparatus comprising:

a supply terminal coupled to an enable terminal;

fault detection circuitry having a terminal;

fault latch circuitry having a first terminal, a second terminal, and a third terminal, the first terminal of the fault latch circuitry being a power terminal coupled to and receiving power from the enable terminal, the second terminal of the fault latch circuitry coupled to the terminal of the fault detection circuitry; and a transistor having a first terminal and a control terminal, the first terminal coupled to the supply terminal, the control terminal of the transistor coupled to the third terminal of the fault latch circuitry.

9. The apparatus of claim 8, further comprising:

fuse circuitry having a first terminal, a second terminal, and a control terminal, the first terminal of the fuse circuitry coupled to the supply terminal, the control terminal of the fuse circuitry coupled to the first terminal of the transistor; and converter circuitry having a terminal coupled to the second terminal of the fuse circuitry.

10. The apparatus of claim 9, wherein the fuse circuitry is first fuse circuitry, the terminal of the converter circuitry is a first terminal, the converter circuitry further having a second terminal, the apparatus further comprising:

a logic device having a first terminal and a second terminal, the first terminal of the logic device coupled to the first terminal of the transistor and the control terminal of the first fuse circuitry; and second fuse circuitry having a first terminal and a control terminal, the first terminal of the second fuse circuitry coupled to the second terminal of the converter circuitry, the control terminal of the second fuse circuitry coupled to the second terminal of the logic device.

11. The apparatus of claim 8, wherein the fault latch circuitry includes:

open loop regulator circuitry having a first terminal and a second terminal, the first terminal of the open loop regulator circuitry coupled to the supply terminal; and latch circuitry having a terminal and a second terminal, the first terminal of the latch circuitry coupled to the second terminal of the open loop regulator circuitry, the second terminal of the latch circuitry coupled to the control terminal of the transistor.

12. The apparatus of claim 11, wherein the latch circuitry further has a third terminal, and the fault latch circuitry further includes:

level shifter circuitry having a first terminal and a second terminal, the first terminal of the level shifter circuitry coupled to the third terminal of the latch circuitry; and voltage clamp circuitry having a terminal coupled to the second terminal of the open loop regulator circuitry, the first terminal of the latch circuitry, and the second terminal of the level shifter circuitry.

13. The apparatus of claim 11, wherein the fault latch circuitry further includes:

latch safety circuitry having a first terminal and a second terminal, the first terminal of the latch safety circuitry coupled to the second terminal of the open loop regulator circuitry and the first terminal of the latch circuitry; and latch reset circuitry having a terminal coupled to the second terminal of the latch circuitry and the second terminal of the latch safety circuitry.

14. The apparatus of claim 11, wherein the fault latch circuitry further includes:

voltage clamp circuitry having a terminal; and supply rail monitor circuitry having a terminal coupled to the second terminal of the open loop regulator circuitry, the first terminal of the latch circuitry and the terminal of the voltage clamp circuitry.

15. An apparatus comprising:

fuse circuitry configurable to control transmission of power from a supply terminal and having an enable terminal; and fault circuitry coupled to the fuse circuitry, the fault circuitry having latch circuitry configurable to receive power from the enable terminal via the supply terminal and configurable to:

generate an assert fault indication responsive to a fault condition being met;

set a fault gate indication responsive to latching the assert fault indication by the latch circuitry;

disable the transmission of power by the fuse circuitry responsive to latching the assert fault indication by the latch circuitry; and reset the fault gate indication responsive to a reset condition being met.

16. The apparatus of claim 15, the fault circuitry further configured to pull-down a control terminal of the fuse circuitry responsive to the fault circuitry latching the assert fault indication.

17. The apparatus of claim 15, wherein the fuse circuitry is first fuse circuitry, the apparatus further comprising second fuse circuitry coupled to the fault circuitry, the fault circuitry further configured to disable the transmission of power by the second fuse circuitry responsive to latching the assert fault indication.

18. The apparatus of claim 15, wherein the fault circuitry is further configured to hold the fault gate indication in a reset state responsive to the fault condition being met and power is not being supplied to the fault circuitry.

19. The apparatus of claim 15, wherein the fault circuitry is further configured to:

generate a latch supply voltage responsive to stepping down an enable voltage;

level shift the latch supply voltage to set a voltage of a set indication; and set the fault gate indication responsive to latching the assert fault indication.

20. The apparatus of claim 15, further comprising converter circuitry coupled to the fuse circuitry, the converter circuitry to convert the transmission of power from the fuse circuitry from a first voltage to a second voltage.

* * * * *